US009656421B2

(12) United States Patent
Chaumonnot et al.

(10) Patent No.: US 9,656,421 B2
(45) Date of Patent: May 23, 2017

(54) PROCESS FOR PREPARING A SPHERICAL MATERIAL WITH A HIERARCHICAL POROSITY COMPRISING METALLIC PARTICLES TRAPPED IN A MESOSTRUCTURED MATRIX

(75) Inventors: Alexandra Chaumonnot, Lyons (FR); Clement Sanchez, Bures-sur-Yvette (FR); Cedric Boissiere, Paris (FR); Frederic Colbeau-Justin, Ivry-sur-Seine (FR); Audrey Bonduelle, Francheville (FR)

(73) Assignees: CENTRE NATIONAL DE LA RECHERCHE SCIENTIFIQUE, Paris (FR); IFP ENERGIES NOUVELLES, Rueil (FR); UNIVERSITE PIERRE ET MARIE CURIE, Paris (FR)

( * ) Notice: Subject to any disclaimer, the term of this patent is extended or adjusted under 35 U.S.C. 154(b) by 644 days.

(21) Appl. No.: 13/995,548

(22) PCT Filed: Dec. 15, 2011

(86) PCT No.: PCT/FR2011/000655
§ 371 (c)(1),
(2), (4) Date: Oct. 7, 2013

(87) PCT Pub. No.: WO2012/085356
PCT Pub. Date: Jun. 28, 2012

(65) Prior Publication Data
US 2014/0021096 A1    Jan. 23, 2014

(30) Foreign Application Priority Data
Dec. 22, 2010  (FR) ..................... 10 05031

(51) Int. Cl.
| | | |
|---|---|---|
| B01J 29/035 | (2006.01) |
| B29C 65/00 | (2006.01) |
| B01J 27/186 | (2006.01) |
| B01J 27/188 | (2006.01) |
| B01J 27/19 | (2006.01) |
| B01J 29/00 | (2006.01) |
| B01J 29/03 | (2006.01) |

(Continued)

(52) U.S. Cl.
CPC ........... *B29C 66/727* (2013.01); *B01J 27/186* (2013.01); *B01J 27/188* (2013.01); *B01J 27/19* (2013.01); *B01J 29/005* (2013.01); *B01J 29/0333* (2013.01); *B01J 29/0341* (2013.01); *B01J 29/041* (2013.01); *B01J 29/044* (2013.01); *B01J 29/045* (2013.01); *B01J 29/46* (2013.01); *B01J 29/48* (2013.01); *B01J 35/002* (2013.01); *B01J 35/006* (2013.01); *B01J 35/023* (2013.01); *B01J 35/1019* (2013.01); *B01J 35/1042* (2013.01); *B01J 35/1057* (2013.01); *B01J 35/1061* (2013.01); *B01J 37/0045* (2013.01); *B01J 37/033* (2013.01); *B01J 37/10* (2013.01); *B01J 37/20* (2013.01); *C01B 37/02* (2013.01); *C01B 39/06* (2013.01); *C01B 39/40* (2013.01); *C10G 49/04* (2013.01); *C10G 49/08* (2013.01); *B01J 29/08* (2013.01); *B01J 29/40* (2013.01); *B01J 29/7007* (2013.01); *Y02P 30/20* (2015.11)

(58) Field of Classification Search
CPC ...................................... B01J 29/045
See application file for complete search history.

(56) References Cited

U.S. PATENT DOCUMENTS

| | | | |
|---|---|---|---|
| 6,492,571 B1 * | 12/2002 | He .................. | B01J 27/08 585/704 |
| 7,179,366 B2 | 2/2007 | Harle et al. | |

(Continued)

FOREIGN PATENT DOCUMENTS

| | | |
|---|---|---|
| EP | 1393802 A1 | 3/2004 |
| EP | 1627852 A1 | 2/2006 |

(Continued)

OTHER PUBLICATIONS

Dag et al., "The synthesis of mesostructured silica films and monoliths functionalised by noble metal nanoparticles," Journal of Materials Chemistry 13(2), pp. 328-334, Jan. 2003.*
Ali, "Preparation and characterization of copper nanoparticles encapsulated inside ZSM-5 zeolite and NO adsorption," Materials Science and Engineering: A 459(1-2), Jun. 2007.*
Mijares, "Novel hybrid materials: functionalized polyoxometalates as potential metalloligands," Doctoral Thesis, Department of Chemistry, Kansas State University, Aug. 2008.*

(Continued)

*Primary Examiner* — Melvin C Mayes
*Assistant Examiner* — James Corno
(74) *Attorney, Agent, or Firm* — Millen White Zelano and Branigan, PC; John Sopp; Anthony Zelano

(57) ABSTRACT

A process is described for the preparation of an inorganic material with a hierarchical porosity in the micropore and mesopore domains. The material has at least two elementary spherical particles having a maximum diameter of 200 microns. The process comprises:
a) preparing a solution containing zeolitic nanocrystals with a maximum nanometric dimension equal to 60 nm based on silicon and/or precursor elements of protozeolitic entities based on silicon;
b) mixing, in solution, metallic particles or at least one metallic precursor of metallic particles, a surfactant and the solution obtained in accordance with a) such that the ratio of the volumes of inorganic and organic materials, $V_{inorganic}/V_{organic}$, is 0.29 to 0.50;
c) aerosol atomization of the solution obtained in b) resulting in formation of spherical particles;
d) drying the particles;
g) eliminating any remaining precursor elements of protozeolitic entities based on silicon and the surfactant.

11 Claims, No Drawings

(51) Int. Cl.
*B01J 29/04* (2006.01)
*B01J 29/46* (2006.01)
*B01J 29/48* (2006.01)
*B01J 35/00* (2006.01)
*B01J 35/02* (2006.01)
*B01J 35/10* (2006.01)
*B01J 37/00* (2006.01)
*B01J 37/03* (2006.01)
*B01J 37/10* (2006.01)
*B01J 37/20* (2006.01)
*C10G 49/04* (2006.01)
*C10G 49/08* (2006.01)
*C01B 37/02* (2006.01)
*C01B 39/06* (2006.01)
*C01B 39/40* (2006.01)
*B01J 29/08* (2006.01)
*B01J 29/40* (2006.01)
*B01J 29/70* (2006.01)

(56) References Cited

U.S. PATENT DOCUMENTS

| | | |
|---|---|---|
| 7,687,430 B2 | 3/2010 | Guillaume et al. |
| 7,807,598 B2 | 10/2010 | Chaumonnot et al. |
| 7,851,320 B2 | 12/2010 | Chaumonnot et al. |
| 8,226,740 B2 | 7/2012 | Chaumonnot et al. |
| 2004/0132614 A1 | 7/2004 | Harle et al. |
| 2006/0292054 A1 | 12/2006 | Chaumonnot et al. |
| 2008/0020926 A1 | 1/2008 | Guillaume et al. |
| 2008/0072705 A1* | 3/2008 | Chaumonnot ......... C01B 39/48 75/338 |
| 2009/0029847 A1 | 1/2009 | Euzen et al. |
| 2009/0232720 A1 | 9/2009 | Chaumonnot et al. |
| 2010/0297002 A1 | 11/2010 | Chaumonnot et al. |
| 2011/0033375 A1 | 2/2011 | Chaumonnot et al. |
| 2011/0073522 A1* | 3/2011 | Bonduelle ............... B01J 21/12 208/57 |
| 2011/0155641 A1* | 6/2011 | Bonduelle ............. B01J 29/041 208/97 |
| 2011/0230691 A1 | 9/2011 | Bonduelle et al. |
| 2011/0293941 A1 | 12/2011 | Chaumonnot et al. |

FOREIGN PATENT DOCUMENTS

| | | | |
|---|---|---|---|
| EP | 1892038 A1 | 2/2008 | |
| FR | WO 2009144413 A1 * | 12/2009 | ............. B01J 21/12 |
| FR | WO 2009144414 A1 * | 12/2009 | ............ B01J 29/041 |
| WO | 2006/128988 A1 | 12/2006 | |
| WO | 2006128989 A1 | 12/2006 | |
| WO | 2009/060143 A2 | 5/2009 | |
| WO | 2009/060144 A2 | 5/2009 | |
| WO | 2009/130401 A1 | 10/2009 | |
| WO | 2009/144411 A2 | 12/2009 | |
| WO | 2009/144413 A1 | 12/2009 | |
| WO | 2009/144414 A1 | 12/2009 | |
| WO | 2010/020714 A1 | 2/2010 | |

OTHER PUBLICATIONS

Dufaud et al., "New insights into the encapsulation and stabilization of heteropolyacids inside the pore walls of mesostructured silica materials," Journal of Materials Chemistry 19, pp. 1142-1150, Jan. 2009.*
International Search Report from PCT/FR2011/000653 dated Mar. 2, 2012.
International Search Report from PCT/FR2011/000654 dated Mar. 2, 2012.
Related U.S. Appl. No. 13/995,531, filed Oct. 8, 2013.
Related U.S. Appl. No. 13/995,508, filed Sep. 23, 2013.
International Search Report for PCT/FR2011/000655 (Feb. 21, 2012).

* cited by examiner

PROCESS FOR PREPARING A SPHERICAL MATERIAL WITH A HIERARCHICAL POROSITY COMPRISING METALLIC PARTICLES TRAPPED IN A MESOSTRUCTURED MATRIX

The present invention relates to the field of inorganic oxide materials containing transition metals and silicon, in particular to metallosilicates and more precisely aluminosilicate materials having a hierarchical porosity in the micropore and mesopore domains and organized at least in the mesopore domain. More precisely, it relates to the preparation of these materials which are obtained using the "aerosol" synthesis technique. The present invention also relates to the use of these materials, following sulphurization, as catalysts in various processes for the transformation of hydrocarbon feeds, particularly relating to the fields of hydrotreatment and hydroconversion.

PRIOR ART

The composition and use of catalysts for the hydroconversion (HDC) and hydrotreatment (HDT) of hydrocarbon feeds are respectively described in the work "Hydrocracking Science and Technology", 1996, J. Scherzer, A. J. Gruia, Marcel Dekker Inc and in the article by B. S Clausen, H. T. Topsøe, F. E. Massoth, from the work "Catalysis Science and Technology", 1996, volume 11, Springer-Verlag. Thus, those catalysts are generally characterized by a hydrodehydrogenating function provided by the presence of an active phase based on at least one metal from group VIB and/or at least one metal from group VB and optionally at least one metal from group VIII of the periodic table of the elements. The most usual formulations are of the cobalt-molybdenum (CoMo), nickel-molybdenum (NiMo) and nickel-tungsten (NiW) type. Such catalysts may be in the bulk form or in the supported state which then uses a porous solid. After preparation, at least one metal from group VIB and/or at least one metal from group VB and optionally at least one metal from group VIII present in the catalytic composition of said catalysts are usually in the oxide form. The active and stable form for HDC and HDT processes is the sulphurized form, and so such catalysts undergo a sulphurization step.

The skilled person is generally aware that good catalytic performances in the fields of application mentioned above are a function of 1) the nature of the hydrocarbon feed to be treated, 2) the process used, 3) the functional operating conditions selected, and 4) the catalyst used. In this latter case, it is also known that a catalyst with a high catalytic potential is characterized by 1) an optimized hydrodehydrogenating function (associated active phase completely dispersed at the surface of the support and having a high metal content) and 2) in the particular case of processes using hydroconversion reactions (HDC), by a good balance between said hydrodehydrogenating function and the cracking function provided by the acid function of a support. In general, irrespective of the nature of the hydrocarbon feed to be treated, the reagents and reaction products should also have satisfactory access to the active sites of the catalyst which should also have a large active surface area, which means that there are specific constraints in terms of the structure and texture of the oxide support present in said catalysts. This latter point is particularly critical in the case of the treatment of "heavy" hydrocarbon feeds.

The usual methods leading to the formation of the hydrodehydrogenating phase of HDC and HDT catalysts consist in depositing molecular precursor(s) of at least one group VIB metal and/or at least one metal from group VB and optionally at least one metal from group VIII on an oxide support using the technique known as "dry impregnation", followed by steps for maturation, drying and calcining, resulting in the formation of the oxidized form of said metal(s) employed. Next, a final step for sulphurizing, generating the active hydrodehydrogenating phase, is then carried out as mentioned above.

The catalytic performances of the catalysts obtained using such conventional synthesis protocols have been studied in depth. In particular, it has been shown that for relatively high metal contents, phases appear which are refractory to sulphurization formed as a consequence of the calcining step (sintering phenomenon) (B. S. Clausen, H. T. Topsøe, and F. E. Massoth, from the work "Catalysis Science and Technology", 1996, volume 11, Springer-Verlag). As an example, in the case of catalysts of the CoMo or NiMo type supported on an alumina type support, these are 1) crystallites of $MoO_3$, NiO, CoO, $CoMoO_4$ or $Co_3O_4$, of a size sufficient to be detected in XRD, and/or 2) species of the $Al_2(MoO_4)_3$, $CoAl_2O_4$ or $NiAl_2O_4$ type. The three species cited above containing the element aluminium are well known to the skilled person. They result from the interaction between the alumina support and precursor salts of the active hydrodehydrogenating phase in solution, which in practice results in a reaction between $Al^{3+}$ ions extracted from the alumina matrix and said salts in order to form Anderson heteropolyanions with formula $[Al(OH)_6Mo_6O_{18}]^{3-}$, which are themselves precursors of phases which are refractory to sulphurization. The presence of all of these species results in a non-negligible indirect loss of catalytic activity of the associated catalyst because not all of the elements belonging to at least one metal from group VIB and/or at least one metal from group VB and optionally at least one metal from group VIII are used to their maximum potential since a portion thereof is immobilized in low activity or inactive species.

The catalytic performances of the conventional catalysts described above could thus be improved, in particular by developing novel methods for the preparation of these catalysts which could be used to:

1) ensure good dispersion of the hydrodehydrogenating phase, in particular for high metal contents (for example by controlling the size of the particles based on transition metals, maintaining the properties of those particles after heat treatment, etc.);
2) limit the formation of species which are refractory to sulphurization (for example by obtaining a better synergy between the transition metals forming the active phase, controlling the interactions between the hydrodehydrogenating active phase (and/or its precursors) and the porous support employed, etc.);
3) ensure good diffusion of reagents and reaction products while keeping the developed active surface areas high (optimization of chemical, textural and structural properties of the porous support).

In order to satisfy the needs expressed above, hydroconversion and hydrotreatment catalysts have been developed wherein the precursors of the active hydrodehydrogenating phase are formed from heteropolyanions (HPA), for example heteropolyanions based on cobalt and molybdenum (CoMo systems), nickel and molybdenum (NiMo systems), nickel and tungsten (NiW), nickel, vanadium and molybdenum (NiMoV systems) or phosphorus and molybdenum (PMo). As an example, patent application FR 2.843.050 discloses a hydrorefining and/or hydroconversion catalyst comprising at least one element from group VIII and at least molybdenum and/or tungsten present at least in part in the form of heteropolyanions in the oxide precursor. In general, the heteropolyanions are impregnated onto an oxide support.

About a decade ago, other catalysts with supports having a controlled hierarchical porosity were developed. In the context of applications pertaining to the fields of hydrotreatment, hydroconversion and the production of hydrocarbon feeds, apart from the accessibility (linked to pore size)/developed active surface (linked to the specific surface area) compromise, control of which is desirable, it is important to control parameters such as pore length, the tortuosity or the connectivity between the pores (defined by the access number of each cavity). The structural properties linked to a periodic arrangement and to a particular morphology of the pores are parameters which are essential to control. As an example, US patent 2007/152181 discloses that for the transformation of various oil cuts, it is advantageous to use mesostructured alumina type catalyst supports developing a large specific surface area and a homogeneous pore size distribution.

SUMMARY OF THE INVENTION

The present invention concerns a process for the preparation of an inorganic material with a hierarchical porosity in the micropore and mesopore domains, said material being constituted by at least two elementary spherical particles having a maximum diameter of 200 microns, each of said spherical particles comprising metallic particles containing at least one or more metals selected from vanadium, niobium, tantalum, molybdenum, tungsten, iron, copper, zinc, cobalt and nickel, said metallic particles being present within a matrix, which is mesostructured, based on silicon oxide, having microporous walls with a thickness in the range 1 to 60 nm, said process comprising at least the following steps:

a) preparing a solution containing zeolitic nanocrystals with a maximum nanometric dimension equal to 60 nm based on silicon and/or precursor elements of proto-zeolitic entities based on silicon;

b) mixing, in solution, said metallic particles or at least one metallic precursor of said metallic particles, at least one surfactant and at least said solution obtained in accordance with a) such that the ratio of the volumes of inorganic and organic materials, $V_{inorganic}/V_{organic}$ is in the range 0.29 to 0.50, c) aerosol atomization of said solution obtained in step b) in order to result in the formation of spherical droplets;

d) drying said particles;

g) eliminating at least said template and at least said surfactant.

Said preparation process in accordance with the invention comprising said steps a), b), c), d) and g) is termed the principal process of the invention. The inorganic material prepared in accordance with the principal process of the invention is a mesostructured, entirely amorphous material, which is partially crystalline (mixed amorphous/crystalline) or entirely crystalline.

In accordance with a first preferred implementation of the preparation process in accordance with the invention, after said step d), a step e) is carried out consisting of autoclaving the particles obtained from said step d), then a step f) is carried out, consisting of drying said particles obtained at the end of said step e). Said step f) is then followed by carrying out said step g) for eliminating at least said template and at least said surfactant. Said first implementation of the process of the invention comprising said steps a), b), c), d), e), f) and g), is termed the secondary process of the invention. The inorganic material prepared in accordance with the secondary process of the invention is an entirely crystalline mesostructured material.

The expression "process of the invention" is used indiscriminately to designate the principal process of the invention, the secondary process of the invention and the various implementations of the process described below in the present description.

In accordance with the invention, the matrix based on silicon oxide forming each of the elementary spherical particles of the material prepared in accordance with the process of the invention is thus constituted either wholly by proto-zeolitic entities (amorphous walls), or wholly by zeolitic entities (crystalline walls) or by a mixture of proto-zeolitic entities and zeolitic entities (partially crystalline walls). In particular, the sole use of precursor elements of proto-zeolitic entities during the synthesis of the solution of step a) of the principal process of the invention (absence of any optional autoclaving step) results in totally amorphous walls of the microporous/mesostructured mixed oxide matrix based on silicon. Similarly, using only zeolite nanocrystals with a nanometric dimension of 60 nm or less during the synthesis of the colloidal solution of step a) of the principal process of the invention results in totally crystalline walls of the microporous/mesostructured mixed oxide matrix based on silicon. Again by way of example, the simultaneous use of precursor elements of proto-zeolitic entities and of zeolite nanocrystals with a nanometric dimension of 60 nm or less during the synthesis of the solution of step a) of the principal process of the invention (absence of any optional autoclaving step) results in walls of the microporous/mesostructured mixed oxide matrix based on silicon which are partially crystalline. To finish, the simultaneous use of precursor elements of proto-zeolitic entities and zeolite nanocrystals with a nanometric dimension of 60 nm or less during the synthesis of the solution of step a) of the secondary process of the invention (presence of an autoclaving step) results in walls of the micro/mesostructured mixed oxide matrix based on silicon which are totally crystalline.

Said proto-zeolitic entities, or said zeolitic entities or indeed the mixture of proto-zeolitic entities and of zeolitic entities are at the origin of the microporosity present within each of the spherical particles of the material obtained in accordance with the process of the invention. Said matrix based on silicon oxide forming each of the elementary spherical particles of the material prepared in accordance with the process of the invention is either entirely silicic or it comprises, in addition to silicon, at least one element Y selected from aluminium, iron, boron, indium and gallium, preferably aluminium.

INTEREST OF THE INVENTION

The preparation process proposed by the present invention is a simple process which operates continuously. By using the aerosol technique, it can produce an inorganic material with a hierarchical porosity in the micropore and mesopore domains and is organized at least in the mesopore domain, formed by elementary spherical particles within which metallic particles are trapped in a mixed micro/mesostructured matrix based on silicon.

The material obtained in accordance with the preparation process of the invention is an advantageous catalytic precursor. It is advantageously used, following sulphurization, as a catalyst in applications relating to the hydrotreatment and hydroconversion of hydrocarbon feeds. In particular, the metallic particles are precursor species of the sulphurized active phase present in the catalyst obtained from the material prepared in accordance with the process of the invention.

The preparation process in accordance with the invention can be used to obtain a material which simultaneously has properties due to the presence of metallic particles based on elements selected from vanadium, niobium, tantalum, molybdenum, tungsten, iron, copper, zinc, cobalt and nickel, in particular metallic particles in the form of heteropolyanions (better dispersion of the active phase, better synergy between the metallic species, reduction of phases which are refractory to sulphurization, etc.) and the structural and textural properties due to mixed micro/mesostructured matrixes based on silicon obtained by the aerosol technique.

Preferably, said matrix based on silicon oxide forming each of the elementary spherical particles of the material prepared in accordance with the process of the invention comprises, in addition to silicon, at least one element Y selected from aluminium, iron, boron, indium and gallium, preferably aluminium, in order to form an aluminosilicate material. When Y is aluminium, the material prepared in accordance with the process of the invention thus has acido-basic properties which are superior to the acido-basic properties of prior art aluminosilicate materials prepared in the absence of precursors of proto-zeolitic entities and using synthesis protocols which are well known to the skilled person using inorganic precursors of silica and alumina.

In addition, the material prepared in accordance with the process of the invention is constituted by spherical elementary particles with a controlled size, namely having a maximum diameter equal to 200 µm, preferably less than 100 µm, advantageously being 50 nm to 50 µm, highly advantageously 50 nm to 30 µm and still more advantageously 50 nm to 10 µm. The limited size of these particles as well as their homogeneous spherical shape results in better diffusion of the reagents and reaction products when used as a catalyst the material of which, prepared in accordance with the process of the invention, is a precursor, in potential industrial applications compared with known prior art materials not obtained using an aerosol technique and in the form of elementary particles with a non-homogeneous shape, i.e. irregular, with a dimension much greater than 500 nm.

Trapping said metallic particles within the micro/mesostructured mixed oxide matrix generates additional favourable technical effects, such as control over the dimensions of said metallic particles, an increase in the thermal stability of said metallic particles, the development of original metallic particle/support interactions, etc. Said metallic particles are, for example, in the form of polyoxometallates, preferably in the form of heteropolyanions (HPA).

In addition, the preparation process using the aerosol technique of the invention can be employed in order to produce precursors of sulphurized catalysts in a manner which is simple and with a limited number of steps. The preparation process using the aerosol technique of the invention can be employed in order to conserve the stoichiometry of the non-volatile species, present in the initial solution in accordance with said step b), in the material obtained using the process of the invention, and thus can ensure that the anticipated properties are obtained in the final material in terms of chemical composition, in contrast to other processes which involve filtration and washing steps which are often at the origin of a loss of the elements initially present in the solution for the preparation of the final material.

DISCLOSURE OF THE INVENTION

The present invention pertains to a process for the preparation of an inorganic material with a hierarchical porosity in the micropore and mesopore domains, said material being constituted by at least two elementary spherical particles having a maximum diameter of 200 microns, each of said spherical particles comprising metallic particles containing at least one or more metals selected from vanadium, niobium, tantalum, molybdenum, tungsten, iron, copper, zinc, cobalt and nickel, said metallic particles being present within a matrix, which is mesostructured, based on silicon oxide, having microporous walls with a thickness in the range 1 to 60 nm, said process comprising at least the following steps:

a) preparing a solution containing zeolitic nanocrystals with a maximum nanometric dimension equal to 60 nm based on silicon and/or precursor elements of proto-zeolitic entities based on silicon;

b) mixing, in solution, said metallic particles or at least one metallic precursor of said metallic particles, at least one surfactant and at least said solution obtained in accordance with a) such that the ratio of the volumes of inorganic and organic materials, $V_{inorganic}/V_{organic}$, is in the range 0.29 to 0.50;

c) aerosol atomization of said solution obtained in step b) in order to result in the formation of spherical droplets;

d) drying said particles;

g) eliminating at least said template and at least said surfactant.

Said preparation process in accordance with the invention comprising said steps a), b), c), d) and g) is termed the principal process of the invention. The inorganic material prepared in accordance with the principal process of the invention is an entirely amorphous mesostructured material, which is partially crystalline (mixed amorphous/crystalline) or entirely crystalline.

An entirely amorphous mesostructured material is obtained in accordance with the principal process of the invention when said step a) consists of preparing a solution containing only precursor elements of proto-zeolitic entities based on silicon, namely at least one template and at least one silicic agent: the matrix based on silicon oxide forming each of the spherical particles of said amorphous material prepared in accordance with the principal process of the invention has amorphous walls constituted by proto-zeolitic entities which are at the origin of the microporosity present in each of the spherical particles of said material. The proto-zeolitic entities are species prepared from reagents used for the synthesis of zeolites in accordance with said step a) of the process of the invention, the preparation of said species not having been conducted to the stage of crystalline zeolite formation. This means that said proto-zeolitic entities, which are small, are not detected when they are characterized by wide angle X-ray diffraction. More precisely and in accordance with the invention, the proto-zeolitic entities constituting the amorphous microporous walls of the matrix of each of the spherical particles of said amorphous material prepared in accordance with the principal process of the invention are species which can act as a primer for the synthesis of any zeolite which is known to the skilled person, in particular, but not exhaustively, the synthesis of zeolites recorded in the "Atlas of zeolite framework types", 6th revised edition, 2007, C. Baerlocher, L. B.

McCusker, D. H. Olson. The constituent proto-zeolitic entities of the amorphous walls of the matrix of each of the particles of amorphous material prepared in accordance with the principal process of the invention and at the origin of the microporosity thereof are preferably primer species of at least one zeolite selected from the zeolites IZM-2, ZSM-5, ZSM-12, ZSM-48, ZSM-22, ZSM-23, ZBM-30, EU-2, EU-11, silicalite, beta, zeolite A, faujasite, Y, USY, VUSY, SDUSY, mordenite, NU-10, NU-87, NU-88, NU-86, NU-85, IM-5, IM-12, IM-16, ferrierite and EU-1. Highly preferably, said proto-zeolitic entities constituting the amorphous walls of the matrix of each of the particles of said material are species for initiating at least one zeolite selected from zeolites with structure type MFI, BEA, FAU and LTA. Said amorphous material is a material with a hierarchical porosity in the micropore and mesopore domains and an organized porosity in the mesopore (mesostructure) range.

An entirely crystalline mesostructured material is obtained in accordance with the principal process of the invention when said step a) consists of preparing a solution containing only zeolitic nanocrystals with a maximum nanometric dimension equal to 60 nm based on silicon: the matrix based on silicon oxide forming each of the spherical particles of the crystalline material prepared in accordance with the principal process of the invention has crystalline walls constituted by zeolitic entities, which themselves are at the origin of the microporosity present within each of the spherical particles of said material. Said crystalline material is a material with a hierarchical porosity which is organized in the micropore and mesopore domains.

A partially crystalline mesostructured material is obtained in accordance with the principal process of the invention when said step a) consists of preparing a solution containing both zeolitic nanocrystals with a maximum nanometric dimension equal to 60 nm based on silicon and precursor elements of proto-zeolitic entities, namely at least one template and at least one silicic agent: the matrix based on silicon oxide forming each of the spherical particles of the material prepared in accordance with the principal process of the invention has partially crystalline walls formed from proto-zeolitic entities and zeolitic entities, which themselves are at the origin of the microporosity present within each of the spherical particles of said material. More precisely, said walls are on the one hand amorphous and constituted by proto-zeolitic entities and on the other hand crystalline and constituted by zeolitic entities.

In accordance with a first preferred implementation of the preparation process of the invention, after said step d), a step e) is carried out consisting of autoclaving the particles obtained from said step d) then carrying out a step f) consisting of drying said particles obtained at the end of said e). Said step f) is then followed by carrying out said step g) for eliminating at least said template and at least said surfactant. Said first implementation of the process of the invention comprising said steps a), b), c), d), e), f) and g) is termed the secondary process of the invention. Said secondary process of the invention is advantageous when said step a) consists of preparing a solution containing at least precursor elements of proto-zeolitic entities: autoclaving step e) then transforms said proto-zeolitic entities formed during said step a) of said secondary process into crystalline zeolitic entities. Said step a) of the secondary process of the invention is more advantageously carried out by preparing a solution containing both zeolitic nanocrystals with a maximum nanometric dimension equal to 60 nm based on silicon and precursor elements of proto-zeolitic entities based on silicon. The inorganic material prepared in accordance with the secondary process of the invention is a mesostructured crystalline material: the matrix based on silicon oxide forming each of the spherical particles of the material prepared in accordance with the secondary process of the invention has crystalline walls constituted by zeolitic entities, which are in turn at the origin of the microporosity present within each of the spherical particles of the material of the invention. Said crystalline material obtained in accordance with the secondary process of the invention is a material with a hierarchical porosity which is organized in the micropore and mesopore domains.

The term "process of the invention" is used indiscriminately to denote the principal process of the invention, the secondary process of the invention and the various implementations of the process described below in the present description.

The inorganic crystalline material obtained in accordance with said principal process of the invention or in accordance with said secondary process of the invention is a material with a hierarchical porosity which is organized in the micropore and mesopore domains. The matrix of each of said spherical particles constituting said material has crystalline walls exclusively constituted by zeolitic entities, which are in turn obtained from said proto-zeolitic entities described above and which undergo said step e) of autoclaving (secondary process of the invention) and/or from zeolitic nanocrystals present in said step a) of the principal process of the invention or the secondary process of the invention. In particular, said zeolitic entities constituting the crystalline walls of the matrix of each of the particles of the crystalline material prepared in accordance with the principal or secondary process of the invention and at the origin of the microporosity thereof preferably comprise at least one zeolite selected from the zeolites IZM-2, ZSM-5, ZSM-12, ZSM-48, ZSM-22, ZSM-23, ZBM-30, EU-2, EU-11, silicalite, beta, zeolite A, faujasite, Y, USY, VUSY, SDUSY, mordenite, NU-10, NU-87, NU-88, NU-86, NU-85, IM-5, IM-12, IM-16, ferrierite and EU-1. Highly preferably, said zeolitic entities constituting the crystalline walls of the matrix of each of the particles of said crystalline material comprise at least one zeolite selected from zeolites with structure type MFI, BEA, FAU and LTA. Said zeolitic entities have a dimension which is less than or equal to 60 nm, advantageously less than or equal to 30 nm.

The material prepared in accordance with the process of the invention is a material with a hierarchical porosity in the micropore and mesopore domains and which is organized at least in the mesopore domain. The term "material with a hierarchical and organized porosity", as used in the present invention means a material having a dual porosity on the scale of each of said spherical particles: a mesoporosity, i.e. the presence of pores which are organized on the mesopore scale having a uniform diameter (i.e. identical for each mesopore) in the range 1.5 to 30 nm, preferably in the range 2 to 20 nm, and highly preferably in the range 2 to 15 nm, distributed in a homogeneous and regular manner in each of said particles (mesostructured) and a microporosity induced by the walls of each matrix based on silicon oxide, the characteristics of this microporosity being a function either of the proto-zeolitic entities constituting the amorphous walls of the matrix of each of the spherical particles of amorphous material obtained in accordance with the principal process of the invention, or zeolitic entities constituting the crystalline walls of the matrix of each of the spherical particles of the crystalline material obtained in accordance with the principal process or the secondary process of the invention, or indeed proto-zeolitic entities and zeolitic entities constituting the partially crystalline walls of the matrix of each of the spherical particles of the partially crystalline material obtained in accordance with the principal process of the invention. The microporosity is characterized by the presence of micropores within said walls, with a diameter of less than 1.5 nm. The material obtained in accordance with the process of the invention also has an intraparticulate textural macroporosity. It should be noted that a porosity of a microporous nature may also result from interpenetration of surfactant used during said step b) of the preparation process of the invention with the inorganic wall at the organic-inorganic interface developed during the mesostructuring of the inorganic component of said material. Advantageously, none of the spherical particles constituting the material obtained in accordance with the process of the invention has macropores.

The matrix based on silicon oxide comprised in each of the spherical particles constituting the material prepared in accordance with the process of the invention is mesostructured: it has mesopores having a uniform diameter, i.e. identical for each mesopore, in the range 1.5 to 30 nm, preferably in the range 2 to 20 nm and highly preferably in the range 2 to 15 nm, distributed in a homogeneous and regular manner in each of the spherical particles. The material located between the mesopores of each of said spherical particles is microporous and of a nature which is either amorphous or partially crystalline or totally crystalline. It forms walls or partitions with a thickness in the range 1 to 60 nm, preferably in the range 1 to 30 nm. The thickness of the walls corresponds to the distance separating a first mesopore from a second mesopore, the second mesopore being the pore closest to said first mesopore. The organization of the mesopore described above results in a structure for the matrix based on silicon oxide which may be hexagonal, vermicular or cubic, preferably vermicular.

In accordance with the invention, said metallic particles are trapped in a homogeneous and uniform manner in the matrix comprised in each of said spherical particles of the material prepared in accordance with the process of the invention. They advantageously contain at least one or more metals selected from vanadium, niobium, tantalum, molybdenum and tungsten. Said metallic particles are in particular characterized by Raman spectroscopy and have at least one band with a wave number in the range 750 to 1050 cm$^{-1}$. Raman spectroscopy is a technique which is well known to the skilled person. More precisely, said metallic particles have at least one band with a wave number in the range 750 to 950 cm$^{-1}$ or in the range 950 to 1050 cm$^{-1}$. The band with a wave number in the range 750 to 950 cm$^{-1}$ is attributable to antisymmetric (M-O-M) bond stretching or to symmetric (—O-M-O—) bond stretching. The band with a wave number in the range 950 to 1050 cm$^{-1}$ is attributable to stretching modes of the terminal M=O bonds. The element M present in the M-O-M, —O-M-O— and M=O bonds is preferably selected from vanadium, niobium, tantalum, molybdenum and tungsten and a mixture of these metals. The Raman apparatus used to identify said metallic particles is described below in the present description. Said metallic particles have a mean dimension in the range 0.3 to 3 nm, preferably in the range 0.3 to 2 nm, and more preferably it is greater than or equal to 0.3 nm and strictly less than 1 nm. The dimension of said metallic particles is advantageously measured by transmission electron microscopy (TEM). The absence of detection of metallic particles in TEM means that said metallic particles have a dimension of less than 1 nm. Said metallic particles are preferably selected from metallic particles in the form of polyoxometallates with formula $(X_xM_mO_yH_h)^{q-}$ and metallic particles in the form of oxide nanoparticles; the definitions of this type of metallic particles are given below.

Preferably, said metallic particles are in the form of a polyoxometallate with formula $(X_xM_mO_yH_h)^{q-}$ (I), where H is a hydrogen atom, O is an oxygen atom, X is an element selected from phosphorus, silicon, boron, nickel and cobalt and M is one or more elements selected from vanadium, niobium, tantalum, molybdenum, tungsten, iron, copper, zinc, cobalt and nickel, x being equal to 0, 1, 2, or 4, m being equal to 5, 6, 7, 8, 9, 10, 11, 12 or 18, y being in the range 17 to 72, h being in the range 0 to 12 and q being in the range 1 to 20 (y, h and q being whole numbers). In the definition of this formula, it is intended, in the context of the present invention, that the elements H, X, M and O are present in the polyoxometallate structure. Said metallic particles in the form of a polyoxometallate with formula (I) are characterized by the presence of at least one band with a wave number in the range 750 to 1050 cm$^{-1}$ in Raman spectroscopy. Said metallic particles in the form of a polyoxometallate with formula (I) have a mean dimension in the range 0.6 to 3 nm, preferably in the range 0.6 to 2 nm, and more preferably it is greater than or equal to 0.6 nm and strictly less than 1 nm. Said metallic particles in the form of a polyoxometallate with formula $(X_xM_mO_yH_h)^{q-}$ trapped in the matrix comprised in each of said spherical particles of the material prepared in accordance with the process of the invention advantageously have atoms M wherein the oxidation number is equal to +IV, +V and/or +VI and where M is preferably selected from vanadium, niobium, tantalum, molybdenum and tungsten and a mixture of these metals. The metallic particles in the form of a polyoxometallate are trapped in the matrix in a homogeneous and uniform manner.

In accordance with the invention, said metallic particles in the form of a polyoxometallate with formula (I) are selected from isopolyanions and heteropolyanions (HPA). They are characterized by the presence of at least one band with a wave number in the range 750 to 1050 cm$^{-1}$ in Raman spectroscopy.

The isopolyanions and the heteropolyanions trapped in the matrix comprised in each of said spherical particles of the material prepared in accordance with the process of the invention have been described in full in the work Heteropoly and Isopoly Oxometallates, Pope, Ed Springer-Verlag, 1983. Preferably, said metallic particles with formula (I) are heteropolyanions. Said metallic particles with formula (I), preferably in the form of heteropolyanions, are salts carrying a negative charge q compensated by positively charged counter-ions of an identical or different nature. The counter-ions are advantageously provided by metallic cations, in particular cations of metals from group VIII such as $Co^{2+}$, $Ni^{2+}$, protons $H^+$ and/or ammonium cations $NH_4^+$. When all of the counter-ions are protons $H^+$, the term "heteropolyacid" is generally used to designate the form in which said metallic particles with formula (I) are present. An example of such a heteropolyacid is phosphomolybdic acid ($3H^+.PMo_{12}O_{40}^{3-}$) or phosphotungstic acid ($3H^+.PW_{12}O_{40}^{3-}$).

In accordance with a first embodiment of the material prepared in accordance with the process of the invention consisting of trapping metallic particles in the form of isopolyanions in each of said matrices based on silicon oxide, the element X occurring in the general formula (I) above is absent and x=0. The element M is one or more elements advantageously selected from vanadium, niobium, tantalum, molybdenum, tungsten, cobalt and nickel. More preferably, the element M is one or more elements selected from vanadium, niobium, tantalum, molybdenum and tungsten. The cobalt and/or nickel as the element M in said general formula (I) is/are advantageously present as a mixture with one or more elements M selected from vanadium, niobium, tantalum, molybdenum and tungsten (partial substitution of one or more elements M=V, Nb, Ta, Mo or W by Ni and/or Co). Preferably, the m atoms of element M present in general formula (I) are all exclusively either Mo atoms, or W atoms, or a mixture of Mo and W atoms, or a mixture of W and Nb atoms, or a mixture of Mo and V atoms, or a mixture of W and V atoms, or a mixture of Mo and Co atoms, or a mixture of Mo and Ni atoms, or a mixture of W and Ni atoms. In accordance with said first embodiment, m is equal to 5, 6, 7, 8, 9, 10, 11, 12 or 18. Still more preferably, m is equal to 6, 7 or 12. In the particular case in which the element M is molybdenum (Mo), the value of m is preferably 7. In another particular case in which the element M is tungsten (W), the value of m is preferably 12. In the general formula (I), O designates the element oxygen with $17 \leq y \leq 48$. q designates the charge of the isopolyanion, where $3 \leq q \leq 12$, and H is the element hydrogen, where h=0 to 12. A preferred isopolyanion in accordance with said first embodiment has the formula $H_2W_{12}O_{40}^{6-}$ (h=2, m=12, y=40, q=6) or again the formula $Mo_7O_{24}^{6-}$ (h=0, m=7, y=24, q=6).

In accordance with a second embodiment of the material prepared in accordance with the process of the invention, consisting of trapping metallic particles in the form of heteropolyanions (denoted HPA) in each of said matrices based on silicon oxide, the element X is the central atom in the heteropolyanion structure and is selected from P, Si, B, Ni and Co, with x=1 or 2. The element M is a metal atom which is advantageously in systematic octahedral coordination in the structure of the heteropolyanion. The element M is one or more elements advantageously selected from vanadium, niobium, tantalum, molybdenum, tungsten, cobalt and nickel. More preferably, the element M is one or more elements selected from vanadium, niobium, tantalum, molybdenum and tungsten. The cobalt and/or nickel as the element M in said general formula (I) is/are advantageously present as a mixture with one or more elements M selected from vanadium, niobium, tantalum, molybdenum and tungsten (partial substitution of one or more elements M=V, Nb, Ta, Mo and W by Ni and/or Co). Preferably, the m M atoms present in the general formula (I) are all exclusively either Mo atoms, or W atoms, or a mixture of Mo and W atoms, or a mixture of W and Nb atoms, or a mixture of Mo and V atoms, or a mixture of W and V atoms, or a mixture of Mo and Co atoms, or a mixture of Mo and Ni atoms, or a mixture of W and Ni atoms. In accordance with said second embodiment, m is equal to 5, 6, 7, 8, 9, 10, 11, 12 or 18 and preferably equal to 5, 6, 9, 10, 11, 12 or 18. In the general formula (I), O designates the element oxygen with y in the range 17 to 72, preferably in the range 23 to 42, q designates the charge of the heteropolyanion with $1 \leq q \leq 20$, preferably $3 \leq q \leq 12$, and H is the element hydrogen with h=0 to 12.

A first preferred category of heteropolyanions (second embodiment of the material prepared in accordance with the process of the invention) advantageously trapped in the matrix comprised in each of said spherical particles of the material prepared in accordance with the process of the invention is such that said heteropolyanions have the formula $XM_6O_{24}H_h^{q-}$ (with x=1, m=6, y=24, q=3 to 12 and h=0 to 12) and/or the formula $X_2M_{10}O_{38}H_h^{q-}$ (with x=2, m=10, y=38, q=3 to 12 and h=0 to 12) with H, X, M, O, h, x, m, y and q having the same definitions as those given in general formula (I) above. Such heteropolyanions are termed Anderson heteropolyanions (Nature, 1937, 150, 850). They comprise 7 octahedra located in the same plane and connected together via the edges: 6 octahedra surround the central octahedron containing the heteroelement X. The heteropolyanions $CoMo_6O_{24}H_6^{3-}$ and $NiMo_6O_{24}H_6^{4-}$ are good examples of Anderson heteropolyanions trapped in each of said mesostructured matrices, the Co and the Ni respectively being the heteroelements X of the HPA structure. When they are in the form of cobalt or nickel salts (i.e. when cobalt or nickel is present as a cation in order to compensate for the negative charge of the HPA), such Anderson heteropolyanions with formula $CoMo_6O_{24}H_6^{3-}$ and $NiMo_6O_{24}H_6^{4-}$ have the advantage of reaching an atomic ratio [(promoter=Co and/or Ni)/Mo] in the range 0.4 to 0.6, i.e. close to or equal to an optimal ratio known to the skilled person and in the range 0.4 to 0.6 in order to maximize the performances of the hydrotreatment catalysts, the Co and/or the Ni taken into account for the calculation of this atomic ratio being the Co and/or the Ni present both as counter-ions and heteroelements X of the structure HPA. By way of example, the cobalt or nickel salts of the monomeric 6-molybdocobaltate ion (with formula $CoMo_6O_{24}H_6^{3-}.3/2Co^{2+}$, or $CoMo_6O_{24}H_6^{3-}.3/2Ni^{2+}$) and the cobalt or nickel salts of the dimeric decamolybdocobaltate ion (with formula $Co_2Mo_{10}O_{38}H_4^{6-}.3Co^{2+}$ or $Co_2Mo_{10}O_{38}H_4^{6-}.3Ni^{2+}$) are characterized by atomic ratios [(promoters=Co and/or Ni)/Mo] of 0.41 and 0.5 respectively. Again by way of example, the cobalt or nickel salts of the monomeric 6-molybdonickellate ion (with formula $NiMo_6O_{24}H_6^{4-}.2Co^{2+}$ and $NiMo_6O_{24}H_6^{4-}.2Ni^{2+}$) and the cobalt or nickel salts of the dimeric decamolybdonickellate ion (with formula $Ni_2Mo_{10}O_{38}H_4^{8-}.4Co^{2+}$ and $Ni_2Mo_{10}O_{38}H_4^{8-}.4Ni^{2+}$) are characterized by atomic ratios [(promoters=Co and/or Ni)/Mo] of 0.5 and 0.6 respectively, the Co and/or the Ni taken into account for the calculation of this atomic ratio being the Co and/or the Ni present both as counter-ions and heteroelements X of the HPA structure. In the case in which the HPA contains cobalt (X=Co) and molybdenum (M=Mo) in its structure, it is preferably dimeric. A mixture of the two forms, monomeric and dimeric, of said HPA may also be used. In the case in which the HPA contains nickel (X=Ni) and molybdenum (M=Mo) in its structure, it is preferably monomeric. A mixture of the two forms, monomeric and dimeric, of said HPA may also be used. Highly preferably, the Anderson HPA used in order to obtain the material prepared in accordance with the process of the invention is a dimeric HPA comprising cobalt and molybdenum within its structure and the counter-ion of the HPA salt may be cobalt $Co^{II}_3[Co^{III}_2M_{10}O_{38}H_4]$ or nickel $Ni^{II}_3[Co^{III}_2Mo_{10}O_{38}H_4]$.

A second preferred category of heteropolyanions (second embodiment of the material prepared in accordance with the process of the invention) advantageously trapped in the matrix comprised in each of said spherical particles of the material prepared in accordance with the process of the invention is such that said heteropolyanions have the formula $XM_{12}O_{40}H_h^{q-}$ (x=1, m=12, y=40, h=0 to 12, q=3 to 12) and/or the formula $XM_{11}O_{39}H_h^{q-}$ (x=1, m=11, y=39, h=0 to 12, q=3 to 12) with H, X, M, O, h, x, m, y and q having the same definitions as those given in general formula (I) above. The heteropolyanions with formula $XM_{12}O_{40}H_h^{q-}$ are heteropolyanions having a Keggin structure and the heteropolyanions with formula $XM_{11}O_{39}H_h^{q-}$ are heteropolyanions having a lacunary Keggin structure. The heteropolyanions with a Keggin structure are obtained, for a variety of pH ranges, using the production pathways described in the publication by A. Griboval, P. Blanchard, E. Payen, M. Fournier, J. L. Dubois, Chem. Lett., 1997, 12, 1259. Heteropolyanions with a Keggin structure are also known in substituted forms in which a metallic element from group VIII, preferably cobalt or nickel, is substituted for the metal M present in the formula $XM_{12}O_{40}H_n{}^{q-}$: examples of such substituted Keggin species are the heteropolyanions $PNiMo_{11}O_{40}H^{6-}$ or $PCoMo_{11}O_{40}H^{6-}$ (one Mo atom substituted with one atom of Ni or one atom of Co respectively). The species $PCoMo_{11}O_{40}H^{6-}$ is, for example, prepared in accordance with the protocol described in the publication by L. G. A. van de Water et al. J. Phys. Chem. B, 2005, 109, 14513. Other substituted Keggin species, advantageously trapped in the mesostructured matrix comprised in each of said spherical particles of the material prepared in accordance with the process of the invention, are the species $PVMo_{11}O_{40}{}^{4-}$, $PV_2Mo_{10}O_{40}{}^{5-}$, $PV_3Mo_9O_{40}{}^{6-}$ or $PV_4Mo_8O_{40}{}^{7-}$ (1 or more atoms of V substituting for 1 or more atoms of Mo acting as the element M): these species and their mode of preparation are described in the publication by D. Soogund et al. Appl. Catal. B, 2010, 98, 1, 39. Other substituted Keggin heteropolyanion species are the species $PMo_3W_9O_{40}{}^{3-}$, $PMo_6W_6O_{40}{}^{3-}$, $PMo_9W_3O_{40}{}^{3-}$. Even more substituted Keggin heteropolyanion species and their mode of preparation have been described in the patent application FR 2.764.211: said species have formula $Z_wXM_{11}O_{40}Z'C_{(z-2w)}$. Z is cobalt and/or nickel, X is phosphorus, silicon or boron and M is molybdenum and/or tungsten, Z' is an atom substituting for an atom of the element M and is selected from cobalt, iron, nickel, copper and zinc, and C is an $H^+$ ion or an alkylammonium cation, C acting as a counter-ion, as is Z, w takes the value 0 to 4.5, and z a value between 7 and 9. Examples of heteropolycompounds (heteropolyanions+counter-ions) which are particularly suitable for deploying the material prepared in accordance with the process of the invention and having this formula are the species $PCoMo_{11}O_{40}H(NH_4)_6$, $PNiMo_{11}O_{40}H(NH_4)_6$, $SiCoMo_{11}O_{40}H_2(NH_4)_6$, $Co_3PCoMo_{11}O_{40}H$ and $Co_3PNiMo_{11}O_{40}H$ the preparation of which is described in detail in the application FR 2.764.211. The heteropolyanions described in patent application FR 2.764.211 are advantageous because they have an atomic ratio between the element from group VIII and from group VI which may be up to 0.5.

Keggin heteropolyanions with formula $XM_{12}O_{40}{}^{q-}$ where X is selected from phosphorus, silicon and boron and M is selected from molybdenum and/or tungsten with cobalt and/or nickel as counter-ions have been described in U.S. Pat. No. 2,547,380 and patent application FR 2.749.778. In particular, U.S. Pat. No. 2,547,380 discloses the beneficial use, in hydrotreatment processes, of heteropolyacid salts of metals from group VIII such as cobalt or nickel salts of phosphomolybdic, silicomolybdic, phosphotungstic or silicotungstic acids for hydrotreatment applications. By way of example, nickel phosphotungstate with formula $3/2Ni^{2+} \cdot PW_{12}O_{40}{}^{3-}$ with a Ni/W ratio of 0.125 and cobalt phosphomolybdate with formula $3/2Co^{2+} \cdot PMo_{12}O_{40}{}^{3-}$ may be used. A particular preparation method is described in patent application FR 2.749.778 for the specific preparation of the heteropolycompounds $Co_{7/2}PMo_{12}O_{40}$, $Co_4SiMo_{12}O_{40}$, $Co_{7/2}SiMo_{12}O_{40}$ and $Co_6PMo_{12}O_{40}$, which are particularly suitable for use as metallic particles trapped in the matrix comprised in each of the spherical particles of the material prepared in accordance with the process of the invention. The heteropolycompounds disclosed in patent application FR 2.749.778 are of interest, in particular compared with those disclosed in U.S. Pat. No. 2,547,380, because they have higher atomic ratios (element from group VIII/element from group VI) and thus result in better-performing catalysts. This increase in ratio is obtained by reducing the HPA.

Hence, at least some of the molybdenum or tungsten present has a valency which is less than its normal value of 6, resulting from the composition, for example, of the phosphomolybdic, phosphotungstic, silicomolybdic or silicotungstic acid.

Heteropolyanions having a lacunary Keggin structure and which are particularly suitable for the preparation of the material of the invention are described in patent application FR 2.935.139. They have the formula $Ni_{a+y/2}XW_{11-y}O_{39-5/2} \cdot bH_2O$ in which Ni is nickel, X is selected from phosphorus, silicon and boron, W is tungsten, O is oxygen, y=0 or 2, a=3.5 if X is phosphorus, a=4 if X is silicon, a=4.5 if X is boron and b is a number in the range 0 to 36. Said heteropolyanions have no nickel atoms substituting for a tungsten atom in their structure, said nickel atoms being placed in the position of a counter-ion in the structure of said heteropolyanion. These heteropolyanion salts are advantageous because of their high solubility. According to the teaching of patent application FR 2.935.139, advantageous heteropolyanions for the preparation of the material in accordance with the invention have the formula $Ni_4SiW_{11}O_{39}$ and $Ni_{7/2}PW_{11}O_{39}$.

A third preferred category of heteropolyanions (third implementation of the material prepared in accordance with the process of the invention) advantageously trapped in the matrix comprised in each of said spherical particles of the material prepared in accordance with the process of the invention is such that said heteropolyanions have the formula $P_2Mo_5O_{23}H_h{}^{(6-h)-}$, with h=0, 1 or 2. Such heteropolyanions are termed Strandberg heteropolyanions. The preparation of Strandberg HPAs is described in the article by W-C. Cheng et al. J. Catal., 1988, 109, 163. It has since been shown by J. A. Bergwerff, et al., Journal of the American Chemical Society 2004, 126, 44, 14548, that the use of the heteropolyanion $P_2Mo_5O_{23}H_h{}^{(6-h)-}$, with h=0, 1 or 2, in particular the heteropolyanion $P_2Mo_5O_{23}H_2{}^{4-}$, is of particular advantage for hydrotreatment applications.

Advantageously, the elementary spherical particles constituting said inorganic material prepared in accordance with the process of the invention comprise metallic particles in the form of heteropolyanions selected from the first, the second and/or the third category described above. In particular, said metallic particles may be formed from a mixture of HPA with different formulae belonging to the same category or from a mixture of HPAs belonging to different categories. As an example, it is advantageous to use, alone or as a mixture, HPAs of the $PW_{12}O_{40}{}^{3-}$ type with the Keggin type HPAs $PMo_{12}O_{40}{}^{3-}$, $PCoMo_{11}O_{40}H^{6-}$ and $P_2Mo_5O_{23}H_2{}^{4-}$ which are well known to the skilled person.

In accordance with another embodiment of the material prepared in accordance with the process of the invention, the metallic particles trapped in the matrix based on silicon oxide comprised in each of said spherical particles are oxide nanoparticles characterized by the presence of at least one band with a wave number in the range 750 to 1050 cm$^{-1}$ in Raman spectroscopy. Said oxide nanoparticles comprise at least one metal selected from vanadium, niobium, tantalum, molybdenum, tungsten and a mixture of these metals. Highly preferably, said oxide nanoparticles comprise at least one metal selected from molybdenum, tungsten and a mixture of these two metals. Said metal selected from vanadium, niobium, tantalum, molybdenum, tungsten and a mixture thereof, preferably molybdenum or tungsten, are in an oxygen environment. Examples of said oxide nanoparticles are monomolybdic species, monotungstic species, polymolybdic species or polytungstic species. Such species, in particular polymolybdate species, are described by S. B. Umbarkar et al., Journal of Molecular Catalysis A: Chemical, 310, 2009, 152.

Said oxide nanoparticles have a dimension less than or equal to 3 nm, preferably strictly less than 1 nm and greater than or equal to 0.3 nm. Said oxide nanoparticles are detected by transmission electron microscopy (TEM) and possibly by XRD when their dimensions are greater than 1 nm. Beyond this, the absence of detection in TEM indicates the presence of nanoparticles with a dimension of less than 1 nm. Said metallic nanoparticles are prepared using monometallic precursors such as those described below in the description of the invention.

According to said step a) of the preparation process in accordance with the invention, the solution containing zeolitic nanocrystals with a maximum nanometric dimension equal to 60 nm based on silicon and/or precursor elements of proto-zeolitic entities based on silicon is prepared using operating protocols which are known to the skilled person.

In accordance with a first implementation of said step a) of the preparation process in accordance with the invention, a solution is prepared containing precursor elements of proto-zeolitic entities based on silicon. More particularly, at least one template and at least one silicic precursor are mixed in order to prepare a solution containing the precursor elements of the proto-zeolitic entities based on silicon. The silicic precursor used in order to carry out said step a) for preparing said proto-zeolitic entities is selected from silicon oxide precursors which are well known to the skilled person. In particular, a silicic precursor is advantageously used which is selected from silicic precursors normally used in the synthesis of zeolites; as an example, the following may be used: solid powdered silica, silicic acid, colloidal silica, dissolved silica or a silicic precursor of the alkoxide type with formula $Si(OR)_{4-a}R'_a$ where R=H, methyl or ethyl and R' is an alkyl chain or a functionalized alkyl chain, a being in the range 0 to 4 such as, for example, tetraethoxysilane, also known as tetraethylorthosilicate (TEOS). Preferably, the silicic precursor is TEOS. The template used in order to carry out said step a) for preparing said proto-zeolitic entities may be ionic or neutral depending on the nature of the zeolite obtained from said proto-zeolitic entities. Frequently, organic templates from the following non-exhaustive list are used: organic nitrogen-containing cations such as tetrapropylammonium (TPA), crown ethers, diamines as well as any other organic template which is well known to the skilled person for the synthesis of zeolite. Preferably, said organic template is tetrapropylammonium hydroxide, TPAOH.

In accordance with said first implementation of said step a) of the preparation process in accordance with the invention, said step a) is advantageously carried out in the presence of at least one precursor of at least one element Y selected from aluminium, iron, boron, indium and gallium. Said precursor of the element Y advantageously used in order to carry out said step a) for preparing said proto-zeolitic entities may be any compound comprising the element Y and which is capable of liberating this element in solution, in particular in aqueous or aquo-organic solution, in the reactive form. In the preferred case in which Y is aluminium, the alumina precursor is advantageously an inorganic aluminium salt with formula $AlZ_3$, Z being a halogen, a nitrate or a hydroxide. Preferably, Z is chlorine. The alumina precursor may also be an aluminium sulphate with formula $Al_2(SO_4)_3$. The alumina precursor may also be an organometallic precursor with formula $Al(OR)_3$ where R=ethyl, isopropyl, n-butyl, s-butyl $(Al(O^sC_4H_9)_3)$ or t-butyl or a chelated precursor such as aluminium acetylacetonate $(Al(C_5H_8O_2)_3)$. Preferably, R is s-butyl. The alumina precursor may also be ammonium aluminate or alumina proper in one of its crystalline phases known to the skilled person (alpha, delta, theta, gamma), preferably in the hydrated form or which may be hydrated. It is also possible to use mixtures of the precursors cited above. Some or all of the alumina and silicic precursors may optionally be added in the form of a single compound comprising both aluminium atoms and silicon atoms, for example an amorphous silica alumina.

In accordance with said first implementation of said step a) of the preparation process in accordance with the invention, in general, the solution containing the precursor elements of said proto-zeolitic entities is obtained by preparing a reaction mixture comprising at least one silicic precursor, optionally at least one precursor of at least one element Y selected from aluminium, iron, boron, indium and gallium, preferably at least one alumina precursor, and at least one template, preferably of an organic nature. The reaction mixture is either aqueous or aquo-organic, for example a water-alcohol mixture. The reaction mixture may be placed under hydrothermal conditions under autogenic pressure, optionally by adding a gas, for example nitrogen. Said step a) is preferably carried out at a temperature in the range from ambient temperature to 200° C., preferably in the range from ambient temperature to 170° C. and more preferably at a temperature which does not exceed 120° C. and still more preferably at a temperature which does not exceed 60° C. until a solution is formed which contains the proto-zeolitic entities constituting the microporous walls of the matrix of each of the spherical particles of the material obtained in accordance with the process of the invention. In a preferred operating implementation, the reaction mixture comprising at least said template, at least said silicic precursor and advantageously at least said precursor of at least one element Y selected from aluminium, iron, boron, indium and gallium is matured at ambient temperature in order to obtain a solution containing the proto-zeolitic entities constituting the microporous walls of the matrix of each of the spherical particles of the material obtained in accordance with the process of the invention.

The proto-zeolitic entities obtained by carrying out said first implementation of said step a) of the preparation process in accordance with the invention, in particular the secondary process of the invention, are species which are intermediates in the formation of the zeolitic entities. Transformation of the proto-zeolitic entities constituting the microporous walls of the material obtained at the end of step d) of the secondary process of the invention is the result of the autoclaving step e) of said secondary process of the invention, which results in the formation of crystalline microporous walls entirely constituted by zeolitic entities as described above. Transformation of the proto-zeolitic entities into zeolitic entities is followed by wide angle X-ray diffraction, an analysis technique which is known to the skilled person (no response up to the detection of signals corresponding to the smallest detectable crystalline zeolitic entities).

In accordance with a second implementation of said step a) of the preparation process in accordance with the invention, a colloidal solution is prepared in which zeolitic nanocrystals based on silicon with a maximum nanometric dimension equal to 60 nm are dispersed, starting from at least one template, at least one silicic precursor and preferably at least one precursor of at least one element Y selected from aluminium, iron, boron, indium and gallium, preferably at least one alumina precursor. Said silicic precursor, said precursor of at least said element Y, preferably the alumina precursor, and said template are advantageously selected from the compounds described above for preparing said solution containing precursor elements of proto-zeolitic entities in accordance with said first implementation of said step a) of the preparation process in accordance with the invention. In accordance with said second implementation of said step a) of the preparation process in accordance with the invention, the reaction mixture comprising at least one silicic precursor, preferably at least one precursor of at least one element Y selected from aluminium, iron, boron, indium and gallium, preferably at least one alumina precursor, and at least one template is either aqueous or aquo-organic, for example a water-alcohol mixture. The reaction mixture is advantageously employed under hydrothermal conditions under autogenous pressure, optionally by adding a gas, for example nitrogen, at a temperature in the range 50° C. to 200° C., preferably in the range 60° C. to 170° C. and more preferably at a temperature in the range 60° C. to 120° C. until zeolitic nanocrystals with a maximum nanometric dimension equal to 60 nm are formed. Preferably, the reaction mixture is matured at a temperature in the range 70° C. to 100° C. for a period in the range 3 to 6 days. At the end of said hydrothermal treatment, a colloidal solution is obtained in which said nanocrystals are in the dispersed state. The synthesis of said zeolitic nanocrystals is followed by wide angle X-ray diffraction and the size of said nanocrystals is monitored by light diffusion and by transmission electron microscopy. The skilled person will be capable of adjusting the operating conditions, in particular the conditions of the hydrothermal treatment, in order to obtain said colloidal solution in which said nanocrystals, with a maximum nanometric dimension of 60 nm, are in the dispersed state.

In accordance with a third implementation of said step a) of the preparation process in accordance with the invention, zeolite crystals are redispersed in solution so as to obtain a colloidal solution of zeolitic nanocrystals with a maximum nanometric dimension of 60 nm. The zeolitic crystals used to carry out said step a) in accordance with said third implementation may have a dimension which goes above 60 nm. Any crystalline zeolite which is known in the art which has the property of dispersing in solution, for example in aquo-organic solution, in the form of nanocrystals with a maximum nanometric dimension of 60 nm will be suitable for carrying out said step a). The dispersion of said zeolitic crystals is carried out by any method which is known to the skilled person, for example by sonication. In particular, said zeolite crystals may be purely silicic in type or may contain, in addition to silicon, at least one element Y selected from aluminium, iron, boron, indium and gallium, preferably aluminium. Said zeolitic crystals used to carry out said step a) are synthesised by methods which are known to the skilled person. They may already be in the form of nanocrystals. Obtaining zeolitic crystals which disperse in the form of nanocrystals with a maximum nanometric dimension of 60 nm is also possible by carrying out a functionalization of the surfaces of the nanocrystals. The zeolitic crystals used are either in their as-synthesized form, i.e. still containing template, or in their calcined form, i.e. free of said template. When the zeolite crystals used are in their as-synthesized form, said template is eliminated during step g) of the preparation process of the invention.

Said step a) of the preparation process in accordance with the invention is carried out by deploying one of the three implementations described above or by joint use of at least two of the three implementations described above. In particular, said step a) advantageously consists of preparing a solution containing precursor elements of proto-zeolitic entities based on silicon and an element Y, preferably based on silicon and aluminium, or by preparing a colloidal solution simultaneously containing zeolitic nanocrystals based on silicon with a maximum nanometric dimension of 60 nm and precursor elements based on silicon.

According to said step a) of the preparation process in accordance with the invention and irrespective of the implementation of said step a), it is preferable to operate in a basic reaction medium in order to encourage the development of said proto-zeolitic entities and/or said nanocrystals. The basicity of the solution of said step a) is advantageously provided by the basicity of the template employed.

The solution containing the precursor elements of the proto-zeolitic entities, prepared in accordance with said first implementation of said step a), and the colloidal solution containing zeolitic nanocrystals with a maximum nanometric dimension equal to 60 nm, prepared in accordance with said second implementation of said step a), is obtained using operating protocols which are known to the skilled person. As an example, solutions containing precursor elements of proto-zeolitic entities of the beta type or colloidal solutions containing zeolitic nanocrystals of the beta type are produced using the operating protocol described by P. Prokesova, S. Mintova, J. Cejka, T. Bein et al, Micropor. Mesopor. Mater., 2003, 64, 165. Solutions containing precursor elements of proto-zeolitic entities of the FAU type or colloidal solutions containing zeolitic nanocrystals of the FAU type are produced using the operating protocols described by Y. Liu, W. Z. Zhang, T. J. Pinnavaia et al., J. Am. Chem. Soc., 2000, 122, 8791 and K. R. Kloetstra, H. W. Zandbergen, J. C. Jansen, H. vanBekkum, Microporous Mater., 1996, 6, 287. Solutions containing precursor elements of proto-zeolitic entities of the ZSM-5 type or colloidal solutions containing zeolitic nanocrystals of the ZSM-5 type are produced using the operating protocol described by A. E. Persson, B. J. Schoeman, J. Sterte, J-E. Otterstedt, Zeolites, 1995, 15, 611. In the particular case of a purely silicic material, solutions containing precursor elements of proto-zeolitic entities of the silicalite type or colloidal solutions containing zeolitic nanocrystals of the silicalite type are produced using the operating protocol described by A. E. Persson, B. J. Schoeman, J. Sterte, J-E. Otterstedt, Zeolites, 1994, 14, 557.

The proto-zeolitic entities obtained by carrying out said step a) of the process of the invention, in particular by carrying out said step a) of the principal process of the invention or said step a) of the secondary process of the invention, are species which are intermediates in the formation of the zeolitic entities, in particular zeolite nanocrystals. The transformation of the constituent proto-zeolitic entities of the amorphous microporous walls of the material obtained at the end of the step d) of the preparation process in accordance with the invention is the result of the autoclaving step e) of said secondary process of the invention, which results in the formation of crystalline microporous walls entirely constituted by zeolitic entities as described above. Transformation of the proto-zeolitic entities into zeolitic entities is followed by wide angle X-ray diffraction, an analysis method which is known to the skilled person (no response for the amorphous microporous inorganic materials obtained using the principal preparation process of the invention and detection of signals corresponding at least to smaller crystalline entities detectable for the crystalline microporous inorganic materials obtained using the secondary process of the invention).

According to step b) of the preparation process in accordance with the invention, said metallic particles or their precursors, at least one surfactant and at least said solution obtained in accordance with said step a) are mixed in a medium which is preferably aqueous or aquo-organic.

According to step b) of the preparation process of the invention, the surfactant used is an ionic or non-ionic surfactant or a mixture of the two. Preferably, the ionic surfactant is selected from anionic surfactants such as sulphates, for example sodium dodecylsulphate (SDS). Preferably, the non-ionic surfactant may be any copolymer having at least two portions with different polarities, endowing them with amphiphilic macromolecular properties. These copolymers advantageously belong to one of the following families of polymers: fluorinated polymers (—[CH$_2$—CH$_2$—CH$_2$—CH$_2$—O—CO—R1-, in which R1=C$_4$F$_9$, C$_8$F$_{17}$, etc.), biological copolymers such as polyamino acids (poly-lysine, alginates, etc.), dendrimers, block copolymers constituted by chains of poly(alkylene oxide). Any other copolymer with an amphiphilic nature which is known to the skilled person may be used if it is capable of producing a stable solution (i.e. not leading to the formation of a precipitate in the period preceding atomization) in step b) of the preparation process of the invention, such as for example, poly(styrene-b-acrylamide) (S. Förster, M. Antionnetti, Adv. Mater, 1998, 10, 195-217; S. Förster, T. Plantenberg, Angew. Chem. Int. Ed, 2002, 41, 688-714; H. Colfen, Macromol. Rapid Commun, 2001, 22, 219-252). Preferably, in the context of the present invention, a block copolymer is used which is constituted by chains of poly(alkylene oxide). Said block copolymer is preferably a block copolymer containing two, three or four blocks, each block being constituted by one chain of poly(alkylene oxide). For a two-block copolymer, one of the blocks is constituted by a chain of poly(alkylene oxide) with a hydrophilic nature and the other block is constituted by a poly(alkylene oxide) chain with a hydrophobic nature. For a three-block copolymer, at least one of the blocks is constituted by a poly(alkylene oxide) chain with a hydrophilic nature, while at least one of the other blocks is constituted by a poly(alkylene oxide) chain with a hydrophobic nature. Preferably, in the case of a three-block copolymer, the poly(alkylene oxide) chains with a hydrophilic nature are chains of poly(ethylene oxide) denoted (PEO)$_x$ and (PEO)$_z$ and the chains of poly(alkylene oxide) with a hydrophobic nature are chains of poly(propylene oxide) denoted (PPO)$_y$, chains of poly(butylene oxide), or mixed chains wherein each chain is a mixture of several alkylene oxide monomers. Highly preferably, in the case of a three-block copolymer, a compound constituted by two chains of poly(ethylene oxide) and one chain of poly(propylene oxide) is used. More precisely, a compound with formula (PEO)$_x$-(PPO)$_y$-(PEO)$_z$ is used, where x is in the range 5 to 300, y is in the range 33 to 300 and z is in the range 5 to 300. Preferably, the values for x and z are identical. Highly advantageously, a compound in which x=20, y=70 and z=20 (P123) is used and a compound in which x=106, y=70 and z=106 (F127) is used. Commercially available non-ionic surfactants with the names Pluronic (BASF), Tetronic (BASF), Triton (Sigma), Tergitol (Union Carbide), Brij (Aldrich) may be used as non-ionic surfactants in step b) of the preparation process of the invention. For a four-block copolymer, two of the blocks are constituted by a chain of poly(alkylene oxide) with a hydrophilic nature and the other two blocks are constituted by a chain of poly(alkylene oxide) with a hydrophobic nature.

Any swelling agent that can be used to modify the size of the micelles may advantageously be added with the surfactant. As an example, said swelling agent is polypropylene glycol.

According to said step b) of the preparation process in accordance with the invention, either metallic particles or at least one metallic precursor of said metallic particles is introduced into said mixture. Said metallic particles are selected from metallic particles in the form of a polyoxometallate with formula $(X_xM_mO_yH_h)^{q-}$ (I), in particular isopolyanions or heteropolyanions as described above in the present description, and oxide nanoparticles as described above in the present description. Said metallic particles are prepared using synthesis methods which are known to the skilled person or which are commercially available.

Said metallic particles are readily prepared by dissolving, prior to said step b), the metallic precursor(s) which are necessary to obtain them, in a solvent, said solution then being introduced into the mixture of said step b). Preferably, the solvent used for dissolving the precursor or precursors is aqueous. The solution obtained after dissolving the metallic precursor(s) prior to step b) containing said precursors is clear and the pH is neutral or acidic, preferably acidic. Said metallic particles may also advantageously be prepared by introducing the necessary metallic precursor(s) for producing them directly into the mixture of said step b).

In general and in a manner which is known to the skilled person, the isopolyanions are formed by reacting oxoanions of the $MO_4^{n-}$ type (the value of n depending on the nature of M: n is preferably equal to 2 when M=Mo or W and preferably equal to 3 when M=V, Nb, Ta) together, where M is one or more elements selected from vanadium, niobium, tantalum, molybdenum, tungsten, cobalt and nickel. As an example, molybdenum compounds are well known for this type of reaction since, as a function of pH, the molybdenum compound in solution may be present in the $MoO_4^{2-}$ form or in the form of an isopolyanion $Mo_7O_{24}^{6-}$ obtained in accordance with the reaction: 7 $MoO_4^{2-}$+8 $H^+ \rightarrow Mo_7O_{24}^{6-}$+4 $H_2O$. Regarding tungsten-based compounds, potential acidification of the reaction medium may result in the generation of 1'α-metatungstate, condensed 12-fold: 12 $WO_4^{2-}$+18 $H^+ \rightarrow H_2W_{12}O_{40}^{6-}$+8 $H_2O$. These isopolyanion species, in particular the species $Mo_7O_{24}^{6-}$ and $H_2W_{12}O_{40}^{6-}$, are advantageously employed as metallic particles in the preparation process of the invention. The preparation of isopolyanions is fully described in the work Heteropoly and Isopoly Oxometallates, Pope, Ed Springer-Verlag, 1983 (chapter II, pages 15 and 16).

In general and in a manner which is known to the skilled person, the heteropolyanions are obtained by polycondensation of oxoanions of the $MO_4^{n-}$ type (the value of n depending on the nature of M: n is preferably equal to 2 when M=Mo or W and preferably equal to 3 when M=V, Nb, Ta) around one (or more) oxoanion(s) of the type $XO_4^{q-}$, (the value of q depending on the nature of M, the charge q being dictated by the octet rule and by the nature of X), M being one or more elements selected from vanadium, niobium, tantalum, molybdenum, tungsten, cobalt and nickel and X being an element selected from P, Si, B, Ni and Co. Water molecules are then eliminated and oxo bridges are created between the atoms X and M. These condensation reactions are governed by various experimental factors such as pH, the concentration of the species in solution, the nature of the solvent and the atomic ratio M/X. The preparation of heteropolyanions has been fully described in the work Heteropoly and Isopoly Oxometallates, Pope, Ed Springer-Verlag, 1983 (chapter II, pages 15 and 16).

Particular heteropolyanion preparation methods which can advantageously be carried out to synthesize the metallic particles used in said step b) of the preparation process of the invention are described in patent applications FR 2.935.139, FR 2.764.211, FR 2.749.778 and FR 2.843.050. Other particular modes for preparing heteropolyanions for use as metallic particles for use in the preparation process of the invention are described in the various publications indicated above in the description of the various categories of HPA.

As an example, when carrying out said step b) of the process of the invention, the metallic particles in the form of a polyoxometallate with formula (I), preferably in the form of heteropolyanions, are easily prepared from the metallic precursors necessary for obtaining them; they are either dissolved, prior to carrying out said step b), in a solvent before being introduced into said mixture of step b), or are introduced directly into said mixture of step b). In the case in which said metallic precursors are dissolved in a solvent, preferably aqueous, prior to carrying out to said step a), the solution obtained is clear and has a neutral or acidic pH, preferably acidic. Said metallic particles, preferably heteropolyanions, may also be used in the solid and isolated form, and be introduced directly into the mixture of said step b) of the preparation process of the invention, or be dissolved in a solvent, which is preferably aqueous, before being introduced into said mixture of said step b).

In accordance with the implementation consisting of dissolving the metal precursors of the polyoxometallate with formula (I) prior to carrying out said step b), it is advantageous to add at least one complexing agent for said metallic precursors to the solution containing said precursors in order to facilitate obtaining, during step b), an atomizable mixture with a view to carrying out said step c) of the preparation process of the invention. Said complexing agent may be any compound which is known to the skilled person for possible complexing with the metallic precursors of the HPA type. As an example, said complexing agent may be urea, thiourea or acetylacetonate.

In accordance with the particular implementation in which said metallic particles are oxide nanoparticles as described above in the present description, said nanoparticles are prepared by dissolving, prior to said step b), the metallic precursor(s) necessary to obtain them in a solvent, said solution then being introduced into the mixture of said step b). Preferably, the solvent used to dissolve the precursor or precursors is aqueous. The precursors employed are monometallic precursors. In accordance with this implementation, at least one first monometallic precursor based on a metal selected from vanadium, niobium, tantalum, molybdenum and tungsten, is dissolved prior to carrying out said step b). Preferably, said first monometallic precursor is based on molybdenum or tungsten. It is advantageous to use at least two metallic precursors, each of said precursors being based on a different metal selected from vanadium, niobium, tantalum, molybdenum and tungsten. Thus, an inorganic mesostructured material is obtained in which the nanoparticles based on a metal selected from vanadium, niobium, tantalum, molybdenum and tungsten and other nanoparticles based on another metal selected from vanadium, niobium, tantalum, molybdenum and tungsten are trapped in the matrix based on silicon oxide. As an example, a precursor based on molybdenum and a precursor based on tungsten are advantageously used so as to trap nanoparticles based on molybdenum and nanoparticles based on tungsten in the matrix based on silicon oxide.

In the preferred case in which said nanoparticles comprise tungsten and/or molybdenum, the monometallic precursors formed from the following species are advantageously used in the process of the invention: species of the alcoholate or phenolate type (W—O bond, Mo—O bond), species of the amide type (W—$NR_2$ bond, Mo—$NR_2$ bond), species of the halide type (W—Cl bond, Mo—Cl bond, for example), species of the imido type (W=N—R bond, Mo=N—R bond), species of the oxo type (W=O bond, Mo=O bond), species of the hydride type (W—H bond, Mo—H bond). Advantageously, said first monometallic precursor is selected from the following species: $(NH_4)_2MO_4$ (M=Mo, W), $Na_2MO_4$ (M=Mo, W), $(NH_4)_2MS_4$ (M=Mo, W), $MoCl_5$, $W(OEt)_5$, $W(Et)_6$, $WCl_6$, $WCl_4$, $WPhCl_3$. Advantageously, a first monometallic precursor is used which is based on molybdenum, for example $MoCl_5$. However, any monometallic precursor which is familiar to the skilled person may be employed.

Said metallic particles or their precursors are introduced into the mixture of said step b) in a quantity such that the quantity by weight of vanadium, niobium, tantalum, molybdenum, tungsten and their mixtures is in the range 1% to 40%, expressed as the % by weight of oxide with respect to the final mass of inorganic material in the oxide form, preferably in the range 4% to 35% by weight, preferably in the range 4% to 30% by weight and more preferably in the range 4% to 20% by weight. Said metallic particles or their precursors are also introduced into the mixture of said step b) in a quantity such that the overall weight content of metal from group VIII, in particular cobalt and nickel, is in the range 0 to 15%, expressed as the % by weight of oxide with respect to the final mass of inorganic material in the oxide form, preferably in the range 0.5% to 10% by weight and more preferably in the range 1% to 8% by weight.

The solution obtained at the end of step b) of the preparation process in accordance with the invention may be acidic, neutral or basic. Preferably, said solution is neutral, slightly acidic or slightly basic, i.e. it preferably has a pH in the range 5 to 9. The solution obtained at the end of step b) may be aqueous or it may be a water-solvent mixture, the organic solvent preferably being a polar solvent, in particular an alcohol, preferably ethanol.

The quantity of organic compounds, i.e. of surfactant and template, present in the mixture obtained after carrying out said step b) of the preparation process of the invention is defined with respect to the quantity of inorganic material present in said mixture. The quantity of inorganic material corresponds to the quantity of metallic elements introduced by the metallic precursors defined above or by the metallic particles themselves, to the quantity of silicon material introduced by said silicic precursor and to that of the element Y introduced by said precursor of the element Y when it is present. The volume ratio $V_{inorganic}/V_{organic}$ in the mixture obtained after carrying out step b) is such that the binary organic-inorganic system formed during the atomization step c) of the preparation process of the invention undergoes a process of mesostructuring by self-assembly of the surfactant along with hydrolysis/condensation reactions of the various inorganic precursors. Said volume ratio $V_{inorganic}/V_{organic}$ is defined as follows: $V_{inorganic}/V_{organic} = \Sigma_i(m_{inorg\ i}/\rho_{inorg\ i})/\Sigma_j(m_{org\ j}/\rho_{org\ j})$, where i is from 1 to the total number of inorganic precursors and j is from 1 to the total number of surfactants and templates and in which $m_{inorg\ i}$ is the mass of oxide associated with the inorganic precursor i condensed in the solid elementary particle obtained by atomization, $m_{org\ j}$ is the mass of surfactant or of non-volatile template j in the solid elementary particle obtained by atomization and $\rho_{org\ j}$ and $\rho_{inorg\ i}$ are the respective densities associated with each of the organic non-volatile compounds j and inorganic compounds i. The density of the oxide associated with the inorganic precursor i is equal to the density of the corresponding crystalline oxide reduced by 15%. In the context of the invention, $\Sigma_i(m_{inorg\ i}/\rho_{inorg\ i})$ generally corresponds to the sum of the weight ratios of the oxides of at least one element selected from vanadium, niobium, tantalum, molybdenum, tungsten, iron, copper, zinc, cobalt and nickel supplemented by masses of $SiO_2$ and the oxide of the element Y, preferably $Al_2O_3$, over their respective density. Similarly, $\Sigma_j(m_{org\ j}/\rho_{org\ j})$ generally corresponds to the sum of the weight ratios of the template, for example TPAOH, supplemented by the mass of surfactant, for example the surfactant P123 over their respective density. The optional use of a complexing agent for the metallic precursors of the polyoxometallates is also taken into account in the calculation $\Sigma_i(m_{inorg\ i}/\rho_{inorg\ i})$. The polar solvent, preferably ethanol, as well as the water are not taken into account in the calculation of said ratio $V_{inorganic}/V_{organic}$. The species comprising an element Y, preferably alumina species, which are optionally introduced at a stage subsequent to said step b) of the preparation process of the invention, as described below in the present description, are not taken into account for the calculation of the volume ratio $V_{inorganic}/V_{organic}$ defined above.

In contrast, if the inorganic precursors other than those mentioned above are present in the mixture at the end of step b) of the preparation process, the mass of associated oxides must be taken into account in the calculation of $V_{inorg}$.

In accordance with the invention, the quantity of organic material and the quantity of inorganic material in the mixture at the end of step b) is such that the ratio $V_{inorganic}/V_{organic}$ is in the range 0.29 to 0.50, preferably in the range 0.30 to 0.40.

In accordance with step b) of the process of the invention, the initial concentration of surfactant introduced into the mixture, defined by $c_0$, is such that $c_0$ is less than or equal to $c_{mc}$, the parameter $c_{mc}$ representing the critical micellar concentration which is well known to the skilled person, i.e. the limiting concentration beyond which the phenomenon of self-arrangement of the molecules of surfactant occurs in the solution. Before atomization, the concentration of molecules of surfactant in the solution defined by step b) of the preparation process of the invention thus does not result in the formation of particular micellar phases. In a preferred implementation of the process of the invention, the concentration $c_0$ is less than $c_{mc}$, the ratio $V_{inorganic}/V_{organic}$ is such that the composition of the binary system satisfies the composition conditions for which a mesostructuring mechanism occurs by cooperative self-assembly of the reagents ($V_{inorganic}/V_{organic}$ is in the range 0.29 to 0.50, preferably in the range 0.30 to 0.40) and said solution envisaged in step b) of the preparation process of the invention is a water-alcohol mixture.

In the case in which the solution of step b) of the preparation process of the invention is an water-organic solvent mixture, preferably neutral, it is essential during step b) of the preparation process of the invention that the concentration of surfactant, which is at the origin of the mesostructuring of the matrix, is lower than the critical micellar concentration and that the ratio $V_{inorganic}/V_{organic}$ is in the range 0.29 to 0.50, preferably in the range 0.30 to 0.40, such that evaporation of said aquo-organic solution, preferably neutral, during step c) of the preparation process of the invention by the aerosol technique induces a phenomenon of micellisation or self-assembly resulting in mesostructuring of the matrix of the material obtained in accordance with the process of the invention. When $c_0<c_{mc}$, mesostructuring of the matrix of the material obtained in accordance with the process of the invention is consecutive to a gradual concentration, in each droplet, of the metallic precursor or precursors or of the metallic particles themselves, of the precursor elements of the proto-zeolitic entities and/or of the zeolitic nanocrystals with a maximum nanometric dimension of 60 nm based on silicon and surfactant, until the concentration of surfactant c is greater than $c_{mc}$, resulting in evaporation of the aquo-organic solution, preferably neutral.

The step for atomization of the mixture of said step c) of the preparation process of the invention produces spherical droplets. The size distribution of these droplets is of the log normal type. The aerosol generator used in the context of the present invention is a commercial model 9306A apparatus provided by TSI which has a 6-jet atomizer. Atomization of the solution is carried out in a chamber into which a vector gas, an $O_2/N_2$ mixture (dry air) is fed under a pressure P equal to 1.5 bars. The diameter of the droplets varies as a function of the aerosol apparatus employed. In general, the diameter of the droplets is in the range 150 nm to 600 microns.

In accordance with step d) of the preparation process of the invention, said droplets are then dried using an aerosol tool. This drying is carried out by transporting said droplets via the vector gas, the $O_2/N_2$ mixture, in PVC tubes, which results in gradual evaporation of the solution, for example the aquo-organic solution obtained during said step b) of the preparation process of the invention, and thus to the production of elementary spherical particles. Said drying is completed by passing said particles into an oven the temperature of which can be adjusted, the normal temperature range being from 50° C. to 600° C., preferably 80° C. to 400° C., the residence time of these particles in the oven being of the order of one second. The particles are then collected on a filter. A pump placed at the end of the circuit encourages the species to be channeled into the experimental aerosol device. Drying the droplets in step d) of the preparation process of the invention is advantageously followed by passage through the oven at a temperature in the range 50° C. to 150° C.

In accordance with step g) of the preparation process of the invention, elimination of at least said template and at least said surfactant in order to obtain the inorganic material with a hierarchical porosity is advantageously carried out by chemical extraction processes or by heat treatment, preferably by calcining in air in a temperature range of 300° C. to 1000° C., more precisely in a range of 400° C. to 600° C. for a period of 1 to 24 hours, preferably for a period of 2 to 12 hours.

In accordance with the preparation process in accordance with the invention, at least one precursor of at least one element Y selected from aluminium, iron, boron, indium and gallium, preferably aluminium, is advantageously introduced at one or more stages subsequent to said step a) of the preparation process.

In a first implementation, at least one precursor of at least one element Y is introduced in order to carry out said step b) of the preparation process of the invention. Thus, mixing, in solution, at least one surfactant, at least said solution obtained in accordance with step a) and at least said metallic particles or their precursors is carried out in the presence of at least one precursor of said element Y selected from the precursors of said element Y cited above, preferably from the alumina precursors described above in the present description, in order to carry out said step a) of the preparation process of the invention. In accordance with said first implementation, the preparation of the solution in accordance with step a) of the process of the invention is carried out either in the presence or in the absence of at least one precursor of at least one element Y.

In accordance with a second implementation, at least one precursor of at least one element Y is introduced after carrying out said step d) and/or after carrying out said step g) of the process of the invention, with a view to modifying the surface of the material obtained in accordance with the preparation process of the invention. In accordance with said second implementation, said precursor of at least one element Y, preferably an alumina precursor, is introduced after carrying out said step d) and/or after carrying out said step g) of the process of the invention using any technique for modifying the surface which is familiar to the skilled person, such as grafting of at least one precursor of at least one element Y, dry impregnation of at least one precursor of at least one element Y or excess impregnation of at least one precursor of at least one element Y. Said precursor of at least one element Y, preferably an alumina precursor, introduced in accordance with said second implementation by a surface modification technique, is selected from the precursors of said element Y, preferably from alumina precursors, as described above in the present description, supplemented with a sodium aluminate precursor, in order to carry out said step a) of the process of the invention. In accordance with said second implementation, step a) of the process of the invention is carried out in the presence or in the absence of at least one precursor of at least one element Y, preferably an alumina precursor, and step b) of the process of the invention is carried out in the presence or in the absence of at least one precursor of at least one element Y, preferably an alumina precursor.

In accordance with the preparation process of the invention, said first implementation and said second implementation for introducing at least one precursor of at least one element Y are only optional variations of the preparation process of the invention. In addition, when the matrix based on silicon oxide present in each of the spherical particles of the material obtained in accordance with the preparation process of the invention comprises an element Y, preferably aluminium, said element Y is introduced either during said step a) of the preparation process of the invention, or during said step b) in accordance with said first implementation or indeed after carrying out said step d) and/or after carrying out said step g) of the preparation process of the invention in accordance with said second implementation. The element Y, preferably aluminium, may also advantageously be introduced a number of times at various steps in any of the possible combinations of the implementations described above. In particular, it is advantageous to introduce the aluminium during said step a) and said step b) or during said step a) and subsequently to carrying out said step d) and/or subsequently to carrying out said step g).

In the particular case where the element Y is aluminium, the aluminosilicate obtained in accordance with the preparation process of the invention thus has a molar ratio Si/Al which is defined from the quantity of elemental silicon introduced during step a) of the preparation process of the invention and the total quantity of elemental aluminium introduced in the step or steps of the preparation process of the invention using the various implementations described above. Under these conditions and preferably, the value of the molar ratio Si/Al is at least equal to 0.02, preferably in the range 0.1 to 1000 and highly preferably in the range 1 to 100.

When said first implementation is applied (Y introduced to carry out said step b), the quantities of organic and inorganic material to be introduced in order to carry out step b) should be adjusted as a function of the quantity of supplemental material of element Y, preferably aluminium, introduced during said step b), such that the total quantity of organic and inorganic material introduced in the preparation process of the invention can permit a phenomenon of micellisation, leading to mesostructuring of the matrix of each particle of material prepared in accordance with the process of the invention ($V_{inorganic}/V_{organic}$ ratio in the range 0.29 to 0.50 and preferably in the range 0.30 to 0.40).

In accordance with said first preferred implementation of the process of the invention, termed the secondary process of the invention, after said step d), a step e) is carried out, consisting of autoclaving the particles obtained from said step d) then carrying out a step f) consisting of drying said particles obtained at the end of said step e). Said step f) is then followed by carrying out said step g) for eliminating at least said template and at least said surfactant. Step e) consists of placing said particles obtained from said step d) in a sealed vessel in the presence of a solvent at a given temperature so as to operate under the autogenous pressure inherent to the selected operating conditions. The solvent used is advantageously a polar protic solvent. Preferably, the solvent used is water. The volume of solvent introduced is defined with respect to the volume of the autoclave selected, the mass of dry powder introduced and the treatment temperature. Thus, the volume of solvent introduced is in the range from 0.01% to 20% with respect to the volume of the selected autoclave, preferably in the range 0.05% to 5% and more preferably in the range 0.05% to 1%. The autoclaving temperature is in the range 50° C. to 200° C., preferably in the range 60° C. to 170° C. and more preferably in the range 60° C. to 120° C. in order to allow the zeolitic entities to grow in the walls of the matrix of each of the particles of crystalline material obtained using the secondary process of the invention. Autoclaving is maintained for a period of 1 to 96 hours, preferably for a period of 10 to 72 hours. In accordance with step 0 of said secondary process of the invention, drying of the particles after autoclaving in step e) is advantageously carried out by placing in an oven at a temperature in the range 50° C. to 150° C.

In the preferred case in which said metallic particles trapped in the matrix comprised in each of said spherical particles of the material prepared in accordance with the process of the invention, are in the form of a polyoxometallate with formula $(X_xM_mO_yH_h)^{q-}$ (I), preferably in the form of heteropolyanions, after carrying out said step g), the preparation process of the invention advantageously comprises a step h) consisting of regenerating said metallic particles in the form of a polyoxometallate which may have decomposed during step g). Said regeneration step h) is preferably carried out by washing the solid obtained from said step g) with a polar solvent using a Soxhlet extractor. The function of this type of extractor is well known to the skilled person. Preferably, the extraction solvent is an alcohol, acetonitrile, or water, preferably an alcohol and highly preferably methanol. Said step h) is carried out for a period of 1 to 24 hours, preferably 1 to 8 hours. Said regeneration step h) is carried out when said metallic particles in the form of a polyoxometallate are decomposed during said step g). The decomposition of said metallic particles is demonstrated by Raman spectroscopy which can be used to detect the presence or absence of said metallic particles in the form of polyoxometallates, preferably in the form of heteropolyanions, as a function of the bands appearing in the Raman spectrum. The decomposition of said metallic particles after carrying out said step g) may be partial or complete. Said step h) is a step for partial or complete regeneration of said polyoxometallates.

Said step h) is followed by a drying step i) which is advantageously carried out at a temperature in the range 40° C. to 100° C. and highly advantageously in the range 40° C. to 85° C. Said step i) is carried out for a period in the range 12 to 48 hours. Said step i) is preferably only carried out when the preparation process of the invention includes carrying out said step h).

The process of the invention advantageously comprises at least one step for shaping, preferably carried out after said step d) or said step g) in the case in which the inorganic material is prepared in accordance with the principal process of the invention, or following said step f) or said step g) in the case in which the inorganic material is prepared in accordance with the secondary process of the invention. The operation for shaping the inorganic material obtained from one of steps d) or g) if it is prepared in accordance with said principal process of the invention or obtained from one or steps f) or g) if it is prepared in accordance with the secondary process of the invention consists of mixing said material with at least one porous oxide material which acts as a binder. Said porous oxide material is preferably a porous oxide material selected from the group formed by alumina, silica, silica-alumina, magnesia, clays, titanium oxide, zirconium oxide, lanthanum oxide, cerium oxide, aluminium phosphates, boron phosphates and a mixture of at least two of the oxides cited above. Said porous oxide material may also be selected from alumina-boron oxide, alumina-titanium oxide, alumina-zirconia and titanium oxide-zirconia mixtures. The aluminates, for example magnesium, calcium, barium, manganese, iron, cobalt, nickel, copper or zinc aluminates, as well as mixed aluminates, for example those containing at least two of the metals cited above, are advantageously used as the porous oxide material. It is also possible to use titanates, for example zinc, nickel, or cobalt titanates. It is also advantageously possible to use mixtures of alumina and silica and mixtures of alumina with other compounds such as elements from group VIB, phosphorus, fluorine or boron. It is also possible to use simple, synthetic or natural clays of the dioctahedral 2:1 phyllosilicate or trioctahedral 3:1 phyllosilicate type such as kaolinite, antigorite, chrysotile, montmorillonnite, beidellite, vermiculite, talc, hectorite, saponite or laponite. These clays may optionally be delaminated. Advantageously, it is also possible to use mixtures of alumina and clay and mixtures of silica-alumina and clay. Similarly, using at least one compound as a binder, selected from the group formed by the molecular sieve family of the crystalline aluminosilicate type and synthetic and natural zeolites such as Y zeolite, fluorinated Y zeolite, Y zeolite containing rare earths, X zeolite, L zeolite, beta zeolite, small pore mordenite, large pore mordenite, omega zeolites, NU-10, ZSM-22, NU-86, NU-87, NU-88, and ZSM-5 zeolite, may be envisaged. Of the zeolites, it is usually preferable to use zeolites with a framework silicon/aluminium (Si/Al) atomic ratio which is greater than approximately 3/1. Advantageously, zeolites with a faujasite structure are used, in particular stabilized and ultrastabilized (USY) Y zeolites either in the at least partially exchanged form with metallic cations, for example alkaline-earth metal cations and/or cations of rare earth metals with an atomic number of 57 to 71 inclusive, or in the hydrogen form (Atlas of zeolite framework types, 6$^{th}$ revised Edition, 2007, Ch. Baerlocher, L. B. McCusker, D. H. Olson). Finally, it is possible to use, as the porous oxide material, at least one compound selected from the group formed by the family of non-crystalline aluminosilicate type molecular sieves such as mesosporous silicas, silicalite, silicoaluminophosphates, aluminophosphates, ferrosilicates, titanium silicoaluminates, borosilicates, chromosilicates and aluminophosphates of transition metals (including cobalt). The various mixtures using at least two of the compounds cited above are also suitable for use as a binder.

The inorganic material obtained after the shaping operation is advantageously in the form of a powder, beads, pellets, granules, extrudates (cylinders which may or may not be hollow, multilobed cylinders with 2, 3, 4 or 5 lobes for example, twisted cylinders), or rings, etc., these shaping operations being carried out using conventional techniques which are known to the skilled person. Preferably, the inorganic material obtained in accordance with the process of the invention is in the form of a powder, which is constituted by elementary spherical particles with a maximum diameter of 200 µm.

In a second preferred implementation of the preparation process of the invention, which may or may not be independent of said first implementation and different variants described above, one or more additional element(s) may be introduced into the mixture of said step b) of the preparation process of the invention, and/or by impregnation of the material obtained from said step g) with a solution containing at least said additional element and/or by impregnation of material obtained from said step i) with a solution containing at least said additional element and/or by impregnation of the inorganic material, which has been shaped in accordance with the process of the invention, with a solution containing at least said additional element. Said additional element is selected from metals from group VIII of the periodic classification of the elements, organic agents and doping species belonging to the list of doping elements constituted by phosphorus, fluorine, silicon and boron and mixtures thereof. In accordance with said second implementation of the preparation process of the invention, one or more additional element(s) as defined above is (are) introduced during the course of the preparation process of the invention, in one or more steps. In the case in which said additional element is introduced by impregnation, the dry impregnation method is preferred. Each impregnation step is advantageously followed by a drying step, for example carried out at a temperature in the range 90° C. to 200° C., said drying step preferably being followed by a step for calcining in air, optionally enriched in oxygen, for example carried out at a temperature in the range 200° C. to 600° C., preferably in the range 300° C. to 500° C., for a period in the range 1 to 12 hours, preferably in the range 2 to 6 hours. The techniques for impregnation, in particular dry impregnation, of a solid material with a liquid solution are well known to the skilled person. The doping species selected from phosphorus, fluorine, silicon and boron do not have any catalytic nature per se, but can be used to increase the catalytic activity of the metal(s) present in said metallic particles, in particular when the material is in the sulphide form.

The sources of metals from group VIII used as precursors for said additional element based on at least one metal from group VIII are well known to the skilled person. Of the metals from group VIII, cobalt and nickel are preferred. As an example, nitrates will be used such as cobalt nitrate or nickel nitrate, sulphates, hydroxides such as cobalt hydroxides and nickel hydroxides, phosphates, halides (for example chlorides, bromides or fluorides) or carboxylates (for example acetates and carbonates). In accordance with the particular implementation in which said metallic particles are oxide nanoparticles, said source of the metal from group VIII is used as a second monometallic precursor in said step b) of the preparation process of the invention. More particularly, at least said first metallic precursor, preferably at least said monometallic precursor, based on a metal selected from vanadium, niobium, tantalum, molybdenum and tungsten and at least said second monometallic precursor based on a metal from group VIII preferably selected from nickel and cobalt are dissolved prior to carrying out said step b), said solution then being introduced into the mixture of said step b) of the preparation process in accordance with the invention. Advantageously, a first monometallic precursor based on molybdenum, for example $MoCl_5$, or on tungsten, for example $WCl_4$, and a second monometallic precursor based on nickel or cobalt, for example $Ni(OH)_2$ or $Co(OH)_2$, is used.

The source of boron used as a precursor for said doping species based on boron is preferably selected from acids containing boron, for example orthoboric acid $H_3BO_3$, ammonium biborate, ammonium pentaborate, boron oxide and boric esters. When the metallic particles are in the form of heteropolyanions as described above in the present description, the boron may also be introduced at the same time as one or more of the elements M selected from the list given above (M=vanadium, niobium, tantalum, molybdenum, tungsten, iron, copper, zinc, cobalt and/or nickel) in the form of heteropolyanions (X=boron in the formula $X_xM_mO_yH_h^{q-}$), in particular Keggin, lacunary Keggin, or substituted Keggin heteropolyanions. The following heteropolyanions in particular may be cited: boromolybdic acid and its salts, and borotungstic acid and its salts. The source of boron in the form of heteropolyanions is then introduced during step b) of the preparation process of the invention. In the case in which the source of boron is introduced by impregnation, said step for impregnation with the boron source is carried out using, for example, a solution of boric acid in a water/alcohol mixture or in a water/ethanolamine mixture. The source of boron may also be impregnated using a mixture formed by boric acid, hydrogen peroxide and a basic organic compound containing nitrogen, such as ammonia, primary and secondary amines, cyclic amines, compounds of the pyridine and quinolines family or compounds of the pyrrole family.

The source of phosphorus used as a precursor for said doping species based on phosphorus is preferably selected from orthophosphoric acid $H_3PO_4$, its salts and esters such as ammonium phosphates. When the metallic particles are in the form of heteropolyanions as described above in the present description, the phosphorus may also be introduced at the same time as one or more of the elements M selected from the list given above (M=vanadium, niobium, tantalum, molybdenum, tungsten, iron, copper, zinc, cobalt and/or nickel) in the form of heteropolyanions (X=P in the formula $X_xM_mO_yH_h^{q-}$), especially in the form of Keggin, lacunary Keggin, substituted Keggin heteropolyanions or heteropolyanions of the Strandberg type. The following heteropolyanions in particular may be cited: phosphomolybdic acid and its salts, phosphotungstic acid and its salts. The source of phosphorus in the form of heteropolyanions is then introduced during step b) of the preparation process of the invention. In the case in which the phosphorus source is introduced by impregnation, said step for impregnation with the phosphorus source is carried out using, for example, a mixture formed by phosphoric acid and a basic organic compound containing nitrogen such as ammonia, primary and secondary amines, cyclic amines, compounds from the pyridine and quinoline family or compounds from the pyrrole family.

Many sources of silicon may be employed as precursors of said doping species based on silicon. Thus, it is possible to use ethyl orthosilicate $Si(OEt)_4$, siloxanes, polysiloxanes, silicones, silicone emulsions, or halosilicates such as ammonium fluorosilicate $(NH_4)_2SiF_6$ or sodium fluorosilicate $Na_2SiF_6$. When the metallic particles are present in the form of heteropolyanions as described above in the present description, the silicon may also be introduced at the same time as one or more of the elements M selected from the list given above (M=vanadium, niobium, tantalum, molybdenum, tungsten, iron, copper, zinc, cobalt and/or nickel) in the form of heteropolyanions (X=Si in the formula $X_xM_mO_yH_h^{q-}$), especially in the form of Keggin, lacunary Keggin or substituted Keggin heteropolyanions. The following heteropolyanions in particular may be cited: silicomolybdic acid and its salts, silicotungstic acid and its salts. The source of silicon in the form of heteropolyanions is then introduced during step b) of the preparation process of the invention. In the case in which the source of silicon is introduced by impregnation, said impregnation step with the source of silicon is carried out using, for example, a solution of ethyl silicate in a water/alcohol mixture. The source of silicon may also be impregnated using a compound of silicon of the silicone type or silicic acid in suspension in water.

The sources of fluorine used as precursors for said doping species based on fluorine are well known to the skilled person. As an example, the fluoride anions may be introduced in the form of hydrofluoric acid or its salts. These salts are formed with alkali metals, ammonium or an organic compound. They are, for example, introduced during step b) of the preparation process of the invention. In the case in which the source of fluorine is introduced by impregnation, said step for impregnation with the source of fluorine is carried out using, for example, an aqueous solution of hydrofluoric acid or ammonium fluoride or ammonium bifluoride.

The distribution and localisation of said doping species selected from boron, fluorine, silicon and phosphorus are advantageously determined using techniques such as the Castaing microprobe (distribution profile for the various elements), transmission electron microscopy coupled with X-ray analysis (i.e. EXD analysis which can be used to ascertain the qualitative and/or quantitative elemental composition of a sample from a measurement, using a Si(Li) diode, of the energies of X-ray photons emitted by the region of the sample bombarded by the electron beam) of the elements present in the inorganic material prepared in accordance with the process of the invention, or by establishing a distribution map of the elements present in said material by electron microprobe. These techniques can be used to demonstrate the presence of these doping species. The analysis of the metals from group VIII and that of the organic species as the additional element are generally carried out by X-ray fluorescence elemental analysis.

Said doping species belonging to the list of doping elements constituted by phosphorus, fluorine, silicon, boron and a mixture of these elements is introduced in a quantity such that the total quantity of doping species is in the range 0.1% to 10% by weight, preferably in the range 0.5% to 8% by weight, and more preferably in the range 0.5% to 6% by weight, expressed as the % by weight of oxide, with respect to the weight of the inorganic material prepared according to the process of the invention. This is a total content, i.e. it takes into account the presence of the element constituting the doping species both as the element X in the polyoxometallate particles, in particular in the form of heteropolyanions, and as the doping species. This is in particular the case for the elements P, Si and B. The atomic ratio between the doping species and the element(s) selected from V, Nb, Ta, Mo and W is preferably in the range 0.05 to 0.9, still more preferably in the range 0.08 to 0.8, the doping species and the element(s) selected from V, Nb, Ta, Mo and W taken into account for the calculation of this ratio corresponding to the total quantity, in the material prepared in accordance with the process of the invention, of phosphorus and of element(s) selected from V, Nb, Ta, Mo and W independently of the mode of introduction.

The organic agents used as precursors of said additional element based on at least one organic agent are selected from organic agents which may or may not have chelating properties or reducing properties. Examples of said organic agents are mono-, di- or polyalcohols, which may be etherified, carboxylic acids, sugars, non-cyclic mono-, di- or polysaccharides such as glucose, fructose, maltose, lactose or sucrose, esters, ethers, crown ethers, compounds containing sulphur or nitrogen, such as nitriloacetic acid, ethylenediaminetetraacetic acid, or diethylenetriamine.

In accordance with a third preferred implementation of the preparation process in accordance with the invention, independently or not independently of said first implementation or said second implementation and the various variations described above, at least one sulphur-containing compound is introduced into the mixture of said step b) or during the course of said step g) or during the course of said step h) in order to obtain the inorganic material, at least in part but not completely in the sulphide form. Said sulphur-containing compound is selected from compounds containing at least one sulphur atom which will decompose at low temperatures (80-90° C.) to cause the formation of $H_2S$. As an example, said sulphur-containing compound is thiourea or thioacetamide. In accordance with said third implementation, sulphurization of said material is partial such that the presence of sulphur in said inorganic material does not totally affect the presence of said metal particles.

In accordance with the invention, the material obtained in accordance with the process of the invention advantageously has a specific surface area in the range 50 to 1100 $m^2/g$, advantageously in the range 50 to 600 $m^2/g$ and highly preferably in the range 50 to 400 $m^2/g$. Said elementary spherical particles constituting the material obtained in accordance with the process of the invention have a maximum diameter equal to 200 µm, preferably less than 100 µm, advantageously in the range 50 nm to 50 µm, highly advantageously 50 nm to 30 µm and still more advantageously in the range 50 nm to 10 µm. More precisely, they are present in the material obtained in accordance with the process of the invention in the form of aggregates.

The present invention also concerns a process for the transformation of a hydrocarbon feed comprising 1) bringing an inorganic material obtained in accordance with the preparation process of the invention into contact with a feed comprising at least one sulphur-containing compound, then 2) bringing said material obtained from step 1) into contact with said hydrocarbon feed.

The inorganic material used in order to carry out said step 1) is a partially crystalline or crystalline inorganic amorphous material as defined above in the present description.

In accordance with said step 1) of the transformation process of the invention, the metallic particles in the form of oxide nanoparticles or in the form of polyoxometallates, preferably in the form of heteropolyanions, trapped in the matrix of each of the spherical particles constituting the inorganic material prepared in accordance with the process of the invention, are sulphurized. The transformation of said metallic particles into their associated sulphurized active phase is carried out after heat treatment of said inorganic material obtained in accordance with the process of the invention in contact with hydrogen sulphide at a temperature in the range 200° C. to 600° C., more preferably in the range 300° C. to 500° C., using processes which are well known to the skilled person. More precisely, said sulphurization step 1) of the transformation process of the invention is carried out either directly in the reaction unit of said transformation process using a sulphur-containing feed in the presence of hydrogen and hydrogen sulphide ($H_2S$) introduced as is or obtained from the decomposition of an organic sulphur-containing compound (in situ sulphurization) or prior to charging said material prepared according to the process of the invention into the reaction unit for said transformation process (ex situ sulphurization). In the case of ex situ sulphurization, gaseous mixtures such as $H_2/H_2S$ or $N_2/H_2S$ are advantageously used to carry out said step 1). Said material prepared according to the process of the invention may also be sulphurized ex situ in accordance with said step 1) from molecules in the liquid phase, the sulphurizing agent then being selected from the following compounds: dimethyldisulphide (DMDS), dimethylsulphide, n-butylmercaptan, polysulphide compounds of the tertiononylpolysulphide type (for example TPS-37 or TPS-54 supplied by ATOFINA), these being diluted in an organic matrix composed of aromatic or alkyl molecules. Said sulphurization step 1) is preferably preceded by a step for heat treatment of said inorganic material prepared according to the process of the invention using methods which are well known to the skilled person, preferably by calcining in air in a temperature range in the range 300° C. to 1000° C., and more precisely in the range 500° C. to 600° C., for a period of 1 to 24 hours, preferably for a period of 6 to 15 hours.

In accordance with the invention, said hydrocarbon feed which undergoes the transformation process of the invention comprises molecules containing at least hydrogen and carbon atoms in an amount such that said atoms represent at least 80% by weight, preferably at least 85% by weight of said feed. Said molecules advantageously comprise heteroelements, in particular nitrogen, oxygen and/or sulphur, in addition to the hydrogen atoms and carbon atoms.

Various processes for transformation of hydrocarbon feeds in which the inorganic material in the sulphurized form obtained from said step 1) is advantageously employed are, in particular, hydrotreatment processes, more particularly hydrodesulphurization and hydrodenitrogenation processes, and hydroconversion processes, more particularly hydrocracking, of hydrocarbon feeds comprising saturated and unsaturated aliphatic hydrocarbons, aromatic hydrocarbons, organic oxygen-containing compounds and organic compounds containing nitrogen and/or sulphur as well as organic compounds containing other functional groups. More particularly, said inorganic material in the sulphurized form obtained from said step 1) is advantageously used in processes for the hydrotreatment of hydrocarbon feeds of the gasoline and middle distillate (gas oil and kerosene) type and processes for the hydroconversion and/or hydrotreatment of heavy hydrocarbon cuts such as vacuum distillates, deasphalted oils, atmospheric residues or vacuum residues. More advantageously, said inorganic material in the sulphurized form obtained from said step 1) is deployed in a process for the hydrotreatment of a hydrocarbon feed comprising triglycerides.

The material obtained in accordance with the process of the invention is characterized by a number of analytical techniques, in particular by small angle X-ray diffraction (small angle XRD), wide angle X-ray diffraction (XRD), nitrogen volumetric analysis (BET), transmission electron microscopy (TEM), optionally coupled with X-ray analysis, scanning electron microscopy (SEM), and X-ray fluorescence (XRF). The presence of metallic particles as described above in the present description is demonstrated by various techniques, in particular by Raman, UV-visible or infrared spectroscopy, as well as by microanalysis. Techniques such as nuclear magnetic resonance (NMR) or electron paramagnetic resonance (EPR) could also be used, depending on the metallic precursors employed. When at least one optional doping species selected from boron, fluorine, phosphorus and silicon is introduced; the analysis techniques for identifying these species have been described above in the present description.

The small angle X-ray diffraction technique (values for the angle 2θ in the range 0.5° to 5°) can be used to characterize the periodicity on a nanometeric scale generated by the organized mesoporosity of the mesostructured matrix of the material obtained according to the process of the invention. In the following discussion, the X-ray analysis is carried out on a powder with a diffractometer operating in reflection mode and provided with a back monochromator using the copper radiation line (wavelength 1.5406 Å). The peaks normally observed on the diffractograms corresponding to a given value of the angle 2θ are associated with the lattice spacings $d_{(hkl)}$ which are characteristic of the structural symmetry of the material ((hkl) being the Miller indices of the reciprocal lattice) by Bragg's law: $2 d^*\sin(\theta)=n^*\lambda$. This indexation then allows the lattice parameters (abc) of the direct lattice to be determined, the value of these parameters being a function of the hexagonal, cubic or vermicular structure obtained.

The wide angle X-ray diffraction technique (values for the angle 2θ in the range 6° to) 100° can be used to characterize a crystalline solid defined by repetition of a unit cell or elementary lattice on a molecular scale. It follows the same physical principle as that governing the small angle X-ray diffraction technique. Thus, the wide angle XRD technique is used to analyze the materials obtained in accordance with the process of the invention because it is particularly suited to the structural characterization of the zeolitic entities which may be present in the walls of the matrix of each of the spherical particles of the material obtained in accordance with the process of the invention.

Nitrogen volumetric analysis, corresponding to the physical adsorption of nitrogen molecules in the pores of the material via a gradual increase in the pressure at constant temperature, provides information on the textural characteristics (pore diameter, pore volume, specific surface area) particular to the material obtained according to the process of the invention. In particular, it provides access to the specific surface area and to the mesopore distribution of the material. The term "specific surface area" means the BET specific surface area ($S_{BET}$ in m²/g) determined by nitrogen adsorption in accordance with ASTM standard D 3663-78 derived from the BRUNAUER-EMMETT-TELLER method described in the periodical "The Journal of the American Society", 1938, 60, 309. The pore distribution which is representative of a population of mesopores centred on a range of 2 to 50 nm (IUPAC classification) is determined from the Barrett-Joyner-Halenda model (BJH). The nitrogen adsorption-desorption isotherm in accordance with the BJH model which is obtained is described in the periodical "The Journal of the American Society", 1951, 73, 373, written by E. P. Barrett, L. G. Joyner and P. P. Halenda. In the discussion below, the diameter φ of the mesopores of the mesostructured matrix corresponds to the maximum value for the diameter read off the pore size distribution curve obtained from the adsorption branch of the nitrogen isotherm. In addition, the shape of the nitrogen adsorption isotherm and of the hysteresis loop can provide information on the nature of the mesoporosity and on the presence of the microporosity of the material obtained in accordance with the process of the invention. Quantitative analysis of the microporosity of the material obtained using the process of the invention is carried out using the "t" (Lippens-De Boer method, 1965) or "$\alpha_s$" method (method proposed by Sing) which corresponds to transforms of the initial adsorption isotherm, as described in the work "Adsorption by powders and porous solids. Principles, methodology and applications" by F. Rouquerol, J. Rouquerol and K. Sing, Academic Press, 1999. These methods can in particular be used to provide access to the value of the microporous volume which is characteristic of the microporosity of the material obtained in accordance with the process of the invention.

Concerning the mesostructured matrix, the difference between the value for the mesopore diameter φ and the lattice parameter defined by small angle XRD as described above can be used to provide a quantity e, where e=a−φ, which is characteristic of the thickness of the walls of the mesostructured matrix included in each of the spherical particles of the material obtained in accordance with the process of the invention. Said lattice parameter a is linked to the correlation distance d between pores by a geometric factor which is characteristic of the geometry of the phase. As an example, in the case of a vermicular structure, e=d−φ.

Transmission electron microscopy (TEM) is also a technique which is widely used to characterize the structure of these materials. It can be used to form an image of the solid being studied, the contrasts observed being characteristics of the structural organization, the texture or the morphology of the particles observed; the maximum resolution of the technique is 1 nm. In the discussion below, the TEM photos will be produced from microtome sections of the sample in order to view a section of an elementary spherical particle of the material obtained in accordance with the process of the invention. The image analysis can be used to provide access to the parameters d, φ and e, which are characteristic of the mesostructured matrix defined above.

The morphology and the size distribution of the elementary particles were established by analysis of the photos obtained by scanning electron microscopy (SEM).

The metallic particles either in the form of oxide nanoparticles or in the form of polyoxometallates, more preferably in the form of heteropolyanions (HPA), as described above in the present description are in particular characterized by Raman spectroscopy. The Raman spectra were obtained with a dispersive type Raman spectrometer equipped with a laser with an excitation wavelength of 532 nm. The laser beam was focussed on the sample using a microscope provided with a×50 long working distance objective. The power of the laser at the sample was of the order of 1 mW. The Raman signal emitted by the sample was collected by the same objective and dispersed using a 1800 line/mm grating then collected by a CCD (Charge Coupled Device or charge transfer device) detector. The spectral resolution obtained was of the order of 2 cm$^{-1}$. The spectral zone recorded was between 300 and 1500 cm$^{-1}$. The acquisition period was fixed at 120 s for each Raman spectrum recorded.

Nuclear magnetic resonance (NMR) was also advantageously used to characterize the metallic particles in the form of polyoxometallates, in particular in the form of HPAs. $^{31}$P and $^{29}$Si NMR analyses recorded on 300 or 400 MHz spectrometers can be cited in particular. Nuclear magnetic spectroscopy (NMR), in particular $^{95}$Mo and $^{183}$W NMR is also advantageously used to characterize the metallic oxide nanoparticles described above in the present description.

The invention will now be illustrated by means of the following examples.

EXAMPLES

In the examples below, the aerosol technique used was that described above in the disclosure of the invention: a model 9306A generator with a 6 jet atomizer supplied by TSI was used. The dispersive Raman spectrometer used was a commercial LabRAM Aramis apparatus supplied by Horiba Jobin-Yvon. The laser used had an excitation wavelength of 532 nm. The operation of this spectrograph in the execution of the examples 1 to 5 below was described above.

For each of Examples 1 to 5 below, the ratio $V_{inorganic}/V_{organic}$ of the mixture obtained from step b) containing the metallic particles or their precursors, the precursors of the (proto) zeolitic entities and the surfactant (P123 or F127) was calculated. This ratio is defined as follows: $V_{inorganic}/V_{organic} = \Sigma_i(m_{inorg\ i}/\rho_{inorg\ i})/\Sigma_j(m_{org\ j}/\rho_{org\ j})$, where i is from 1 to the total number of inorganic precursors and j is from 1 to the total number of surfactants and templates and where $m_{inorg\ i}$ is the mass of oxide associated with the inorganic precursor i condensed in the solid elementary particle obtained by atomization, $m_{org\ j}$ is the mass of the surfactant or the non-volatile template j in the solid elementary particle obtained by atomization and $\rho_{org\ j}$ and $\rho_{inorg\ i}$ are the respective densities associated with each of the non-volatile organic j and inorganic i compounds. The density of the oxide associated with the inorganic precursor i is equal to the density of the corresponding crystalline oxide reduced by 15%. For the examples below, $\Sigma_i(m_{inorg\ i}/\rho_{inorg\ i})$ generally corresponds to the sum of the ratios of the masses of the oxides $MoO_3$, $CoO$, $NiO$ and/or $P_2O_5$ added to the masses of $SiO_2$ and $Al_2O_3$ over their respective density. Similarly, $\Sigma_j(m_{org\ j}/\rho_{org\ j})$ generally corresponds to the sum of the weight ratios of the template, i.e. TPAOH, in Examples 1 to 5, supplemented by the mass of surfactant, i.e. the surfactant P123 or F127, in Examples 1 to 5, over their respective density. The polar solvent, ethanol in Examples 1 to 5, as well as the water are not taken into account in the calculation of said ratio $V_{inorganic}/V_{organic}$.

Example 1 (Invention)

Preparation of a material with HPAs of the Strandberg type $H_2P_2Mo_5O_{23}^{4-}.2Co^{2+}$, with 10% by weight of $MoO_3$, 2.08% by weight of CoO and 1.97% by weight of $P_2O_5$ with respect to the final material. The oxide matrix has a hierarchical porosity in the micropore and mesopore domains which is organized in the mesopore domain, with amorphous microporous walls constituted by aluminosilicate protozeolitic entities of the type ZSM-5 (MFI) such that the molar ratio Si/Al=12.

An aqueous solution containing 3.61 mole/L of $MoO_3$, 1.44 mole/L of $H_3PO_4$, 1.44 mole/L of $Co(OH)_2$ was prepared, with stirring, at ambient temperature. Raman analysis carried out on the final material revealed the presence of Strandberg HPA $H_2P_2Mo_5O_{23}^{4-}.2Co^{2+}$, as the major species.

0.44 g of aluminium tri-sec-butoxide was mixed with 2.17 g of an aqueous solution of TPAOH (40% by weight). After stirring for 10 minutes at ambient temperature, 22.4 g of deionized water was added. After homogenization, 4.43 g of TEOS was added then allowed to hydrolyze for 16 hours, with stirring at ambient temperature. Following hydrolysis, the solution was diluted with a solution containing 1.46 g of P123 (Sigma-Aldrich), 45.5 g of deionized water and 5.79 g of ethanol. A solution composed of 10.0 g of deionized water, 0.33 mL of the aqueous Strandberg solution $H_2P_2Mo_5O_{23}^{4-}.2Co^{2+}$, containing 0.72 mole/L of HPA as well as 0.22 g of thiourea was prepared. After stirring for 5 min, this solution was added to the solution containing the P123. The ratio $V_{inorganic}/V_{organic}$ of the mixture was equal to 0.32 and was calculated as described above. The mixture was stirred for 30 minutes then sent to the atomization chamber of the aerosol generator as described in the description above, and the solution was sprayed in the form of fine droplets under the action of a vector gas (dry air) introduced under pressure (P=1.5 bar). The droplets were dried in accordance with the protocol described in the disclosure of the invention above: they were channeled through PVC tubes by means of an $O_2/N_2$ mixture. They were then introduced into an oven adjusted to a fixed drying temperature of 350° C. The powder recovered was then dried for 18 hours at 95° C. The powder was then calcined in air for 5 hours at 550° C. The HPA was then regenerated by washing the solid with methanol for 4 hours using a Soxhlet. Finally, the material was dried at 80° C. for 24 hours. The solid was characterized by small angle XRD, by nitrogen volumetric analysis, by TEM, by SEM, by XRF and by Raman spectroscopy. The TEM analysis showed that the final material had an organized mesoporosity characterized by a vermicular structure. The nitrogen volumetric analysis combined with analysis using the $\alpha_s$ method produced a value for the microporous volume, $V_{micro}$ ($N_2$), of 0.03 mL/g, a value for the mesoporous volume, $V_{meso}$ ($N_2$), of 0.43 mL/g and a specific surface area of the final material of S=217 m$^2$/g. The mesoporous diameter $\phi$ characteristic of the mesostructured matrix was 8.3 nm. The small angle XRD analysis produced a correlation peak at the angle 2θ=0.84°. Bragg's law, 2d*sin(0.42)=1.5406, was used to calculate the correlation distance d between the organized mesopores of the material, i.e. d=10.5 nm. The thickness of the walls of the mesostructured material, defined by e=d−$\phi$, was thus e=2.2 nm. The Si/Al mole ratio obtained by XRF was 12. A SEM image of the spherical elementary particles obtained indicated that these particles have a dimension characterized by a diameter in the range 50 nm to 30 μm, the size distribution of these particles being centred around 15 μm. The Raman spectrum of the final material revealed the presence of Strandberg HPA, $H_2P_2Mo_5O_{23}^{4-}$, with a characteristic band of this heteropolyanion at 941 cm$^{-1}$ and secondary bands at 892, 394 and 369 cm$^{-1}$.

Example 2 (Invention)

Preparation of a material with HPAs of the Strandberg type $H_2P_2Mo_5O_{23}^{4-}.2Co^{2+}$, with 5% by weight of $MoO_3$, 1.04% by weight of NiO and 0.99% by weight of $P_2O_5$ with respect to the final material. The oxide matrix has a hierarchical porosity in the micropore and mesopore domains which is organized in the mesopore domain, with amorphous microporous walls constituted by aluminosilicate protozeolitic entities of the type ZSM-5 (MFI) such that the molar ratio Si/Al=25.

An aqueous solution containing 3.61 mole/L of $MoO_3$, 1.44 mole/L of $H_3PO_4$, 1.44 mole/L of $Ni(OH)_2$ was prepared, with stirring, at ambient temperature. Raman analysis carried out on the final material revealed the presence of Strandberg HPA, $H_2P_2Mo_5O_{23}^{4-}.2Co^{2+}$, as the major species.

0.23 g of aluminium tri-sec-butoxide was mixed with 2.17 g of an aqueous solution of TPAOH (40% by weight). After stirring for 10 minutes at ambient temperature, 22.3 g of deionized water was added. After homogenization, 4.82 g of TEOS was added then allowed to hydrolyze for 16 hours, with stirring at ambient temperature. Following hydrolysis, the solution was diluted with a solution containing 1.45 g of P123 (Sigma-Aldrich), 45.4 g of deionized water and 5.78 g of ethanol. A solution composed of 10.0 g of deionized water and 0.15 mL of the aqueous solution of Strandberg HPA, $H_2P_2Mo_5O_{23}^{4-}.2Co^{2+}$, with 0.72 mole/L of HPA was prepared. After stirring for 5 min, this solution was added to the preceding solution. The ratio $V_{inorganic}/V_{organic}$ of the mixture was equal to 0.32 and was calculated as described above. The mixture was stirred for 30 minutes then sent to the atomization chamber of the aerosol generator as described in the description above, and the solution was sprayed in the form of fine droplets under the action of a vector gas (dry air) introduced under pressure (P=1.5 bar). The droplets were dried in accordance with the protocol described in the disclosure of the invention above: they were channeled through PVC tubes by means of an $O_2/N_2$ mixture. They were then introduced into an oven adjusted to a fixed drying temperature of 350° C. The powder recovered was then dried for 18 hours at 95° C. The powder was then calcined in air for 5 hours at 550° C. The HPA was then regenerated by washing the solid with methanol for 4 hours using a Soxhlet. Finally, the solid was dried at 80° C. for 24 hours. The solid was characterized by small angle XRD, by nitrogen volumetric analysis, by TEM, by SEM, by XRF and by Raman spectroscopy. The TEM analysis showed that the final material had an organized mesoporosity characterized by a vermicular structure. The nitrogen volumetric analysis combined with analysis using the $\alpha_s$ method produced a value for the microporous volume, $V_{micro}$ ($N_2$), of 0.05 mL/g, a value for the mesoporous volume, $V_{meso}$ ($N_2$), of 0.41 mL/g and a specific surface area of the final material of S=225 m²/g. The mesoporous diameter $\phi$ characteristic of the mesostructured matrix was 8.7 nm. The small angle XRD analysis produced a correlation peak at the angle 2θ=0.86°. Bragg's law, 2 d*sin(0.43)=1.5406, was used to calculate the correlation distance d between the organized mesopores of the material, i.e. d=10.3 nm. The thickness of the walls of the mesostructured material, defined by e=d−φ, was thus e=1.6 nm. The Si/Al mole ratio obtained by XRF was 25. A SEM image of the spherical elementary particles obtained indicated that these particles have a dimension characterized by a diameter in the range 50 nm to 30 µm, the size distribution of these particles being centred around 15 µm. The Raman spectrum of the final material revealed the presence of Strandberg HPA, $H_2P_2Mo_5O_{23}^{4-}$, with a characteristic band of this heteropolyanion at 943 cm$^{-1}$ and secondary bands at 894, 396 and 370 cm$^{-1}$.

Example 3 (Invention)

Preparation of a material having oxide nanoparticles comprising molybdenum and cobalt with 5% by weight of $MoO_3$ and 1.04% by weight of CoO with respect to the final material. The oxide matrix has a hierarchical porosity in the micropore and mesopore domains which is organized in the mesopore domain, with amorphous microporous walls constituted by aluminosilicate proto-zeolitic entities of the type ZSM-5 (MFI) such that the molar ratio Si/Al=12.

An aqueous solution containing 0.11 mole/L of $MoCl_5$ and 0.08 mole/L of $Co(OH)_2$ was prepared, with stirring, at ambient temperature.

0.45 g of aluminium tri-sec-butoxide was mixed with 2.16 g of an aqueous solution of TPAOH (40% by weight). After stirring for 10 minutes at ambient temperature, 22.3 g of deionized water was added. After homogenization, 4.59 g of TEOS was added then allowed to hydrolyze for 16 hours, with stirring at ambient temperature. At the end of hydrolysis, a solution composed of 1.58 g of F127 (Sigma-Aldrich), 45.3 g of deionized water and 5.77 g of ethanol was added to the solution containing the precursors of the proto-zeolitic entities. After homogenizing for 5 min, the solution containing the $MoCl_5$ and the $Co(OH)_2$ was added dropwise. The ratio $V_{inorganic}/V_{organic}$ of the mixture was equal to 0.30 and was calculated as described above. The mixture was stirred for 30 minutes then sent to the atomization chamber of the aerosol generator as described in the description above, and the solution was sprayed in the form of fine droplets under the action of a vector gas (dry air) introduced under pressure (P=1.5 bar). The droplets were dried in accordance with the protocol described in the disclosure of the invention above: they were channeled through PVC tubes by means of an $O_2/N_2$ mixture. They were then introduced into an oven adjusted to a fixed drying temperature of 350° C. The powder recovered was then dried for 18 hours at 95° C. The powder was then calcined in air for 5 hours at 550° C. Finally, the solid was dried at 80° C. for 24 hours. The solid was characterized by small angle XRD, by nitrogen volumetric analysis, by TEM, by SEM, by XRF and by Raman spectroscopy. The TEM analysis showed that the final material had an organized mesoporosity characterized by a vermicular structure. The nitrogen volumetric analysis combined with analysis using the $\alpha_s$ method produced a value for the microporous volume, $V_{micro}$ ($N_2$), of 0.04 mL/g, a value for the mesoporous volume, $V_{meso}$ ($N_2$), of 0.41 mL/g and a specific surface area of the final material of S=349 m²/g. The mesoporous diameter $\phi$ characteristic of the mesostructured matrix was 6.0 nm. The small angle XRD analysis produced a correlation peak at the angle 2θ=0.62°. Bragg's law, 2 d*sin(0.31)= 1.5406, was used to calculate the correlation distance d between the organized mesopores of the material, i.e. d=14.2 nm. The thickness of the walls of the mesostructured material, defined by e=d−φ, was thus e=8.2 nm. The Si/Al mole ratio obtained by XRF was 12. A SEM image of the spherical elementary particles obtained indicated that these particles have a dimension characterized by a diameter in the range 50 nm to 30 µm, the size distribution of these particles being centred around 15 µm. The Raman spectrum of the final material revealed the presence of polymolybdate species interacting with the support with characteristic bands for these species at 950 and 887 cm$^{-1}$.

Example 4 (Invention)

Preparation of a material having oxide nanoparticles comprising molybdenum and nickel with 5% by weight of $MoO_3$ and 1.04% by weight of NiO with respect to the final material. The oxide matrix has a hierarchical porosity in the micropore and mesopore domains which is organized in the mesopore domain, with amorphous microporous walls constituted by aluminosilicate proto-zeolitic entities of the type ZSM-5 (MFI) such that the molar ratio Si/Al=12.

An aqueous solution containing 0.11 mole/L of $MoCl_5$ and 0.08 mole/L of $Ni(OH)_2$ was prepared, with stirring, at ambient temperature.

0.45 g of aluminium tri-sec-butoxide was mixed with 2.16 g of an aqueous solution of TPAOH (40% by weight). After stirring for 10 minutes at ambient temperature, 22.3 g of deionized water was added. After homogenization, 4.59 g of TEOS was added then allowed to hydrolyze for 16 hours, with stirring at ambient temperature. A step for maturing the solution was carried out at 80° C. for 24 h. At the end of the step, a solution composed of 1.58 g of F127 (Sigma-Aldrich), 45.3 g of deionized water and 5.77 g of ethanol was added to the solution containing the precursors of the proto-zeolitic entities. After homogenizing for 5 min, the solution containing the $MoCl_5$ and the $Ni(OH)_2$ was added dropwise. The ratio $V_{inorganic}/V_{organic}$ of the mixture was equal to 0.30 and was calculated as described above. The mixture was stirred for 30 minutes then sent to the atomization chamber of the aerosol generator as described in the description above, and the solution was sprayed in the form of fine droplets under the action of a vector gas (dry air) introduced under pressure (P=1.5 bar). The droplets were dried in accordance with the protocol described in the disclosure of the invention above: they were channeled through PVC tubes by means of an $O_2/N_2$ mixture. They were then introduced into an oven adjusted to a fixed drying temperature of 350° C. The powder recovered was then dried for 18 hours at 95° C. The powder was then calcined in air for 5 hours at 550° C. The solid was characterized by small angle XRD, by nitrogen volumetric analysis, by TEM, by SEM, by XRF and by Raman spectroscopy. The TEM analysis showed that the final material had an organized mesoporosity characterized by a vermicular structure. The nitrogen volumetric analysis combined with analysis using the $\alpha_s$ method produced a value for the microporous volume, $V_{micro}$ ($N_2$), of 0.05 mL/g, a value for the mesoporous volume, $V_{meso}$ ($N_2$), of 0.43 mL/g and a specific surface area of the final material of S=360 m²/g. The mesoporous diameter $\phi$ characteristic of the mesostructured matrix was 7.2 nm. The small angle XRD analysis produced a correlation peak at the angle 2θ=0.62°. Bragg's law, 2 d*sin(0.31)= 1.5406, was used to calculate the correlation distance d between the organized mesopores of the material, i.e. d=14.0 nm. The thickness of the walls of the mesostructured material, defined by e=d−φ, was thus e=6.8 nm. The Si/Al mole ratio obtained by XRF was 12. A SEM image of the spherical elementary particles obtained indicated that these particles have a dimension characterized by a diameter in the range 50 nm to 30 μm, the size distribution of these particles being centred around 15 μm. The Raman spectrum of the final material revealed the presence of polymolybdate species interacting with the support with characteristic bands for these species at 951 and 886 cm⁻¹.

Example 5 (Invention)

Preparation of a material having oxide nanoparticles comprising molybdenum and nickel with 5% by weight of $MoO_3$ and 1.04% by weight of NiO with respect to the final material. The oxide matrix has a hierarchical porosity which is organized in the micropore and mesopore domains, with microporous crystalline walls constituted by zeolitic aluminosilicate entities of the ZSM-5 (MFI) type such that the molar ratio Si/Al=59.

An aqueous solution containing 0.11 mole/L of $MoCl_5$ and 0.08 mole/L of $Ni(OH)_2$ was prepared, with stirring, at ambient temperature.

0.10 g of aluminium tri-sec-butoxide was mixed with 2.16 g of an aqueous solution of TPAOH (40% by weight). After stirring for 10 minutes at ambient temperature, 22.3 g of deionized water was added. After homogenization, 5.01 g of TEOS was added then allowed to hydrolyze for 16 hours, with stirring at ambient temperature. A step for maturing the solution was carried out at 80° C. for 24 h. At the end of this step, a solution composed of 1.58 g of F127 (Sigma-Aldrich), 45.3 g of deionized water and 5.77 g of ethanol was added to the solution containing the precursors of the zeolitic entities. After homogenizing for 5 min, the solution containing the $MoCl_5$ and the $Ni(OH)_2$ was added dropwise. The ratio $V_{inorganic}/V_{organic}$ of the mixture was equal to 0.30 and was calculated as described above. The mixture was stirred for 30 minutes then sent to the atomization chamber of the aerosol generator as described in the description above, and the solution was sprayed in the form of fine droplets under the action of a vector gas (dry air) introduced under pressure (P=1.5 bar). The droplets were dried in accordance with the protocol described in the disclosure of the invention above: they were channeled through PVC tubes by means of an $O_2/N_2$ mixture. They were then introduced into an oven adjusted to a fixed drying temperature of 350° C. The powder recovered was then dried for 18 hours at 95° C. 100 mg of this powder was placed in a 1 L autoclave in the presence of 0.6 mL of distilled water. The autoclave was heated to 95° C. for 48 hours. The powder recovered was then oven dried at 100° C. then calcined in air for 5 h at 550° C. The solid was characterized by small angle and wide angle XRD, by nitrogen volumetric analysis, by TEM, by SEM, by XRF and by Raman spectroscopy. The TEM analysis showed that the final material had an organized mesoporosity characterized by a vermicular structure. The nitrogen volumetric analysis combined with analysis using the $\alpha_s$ method produced a value for the microporous volume, $V_{micro}$ ($N_2$), of 0.13 mL/g, for the mesoporous volume, $V_{meso}$ ($N_2$), of 0.33 mL/g and a specific surface area of the final material of S=180 m²/g. The mesoporous diameter $\phi$ characteristic of the mesostructured matrix was 17 nm. The small angle XRD analysis produced a correlation peak at the angle 2θ=1.32°. Bragg's law, 2d*sin(θ)= 1.5406, was used to calculate the correlation distance d between the organized mesopores of the material, i.e. d=67 nm. The thickness of the walls of the mesostructured material, defined by e=d−φ, was thus e=50 nm. Wide angle XRD produced a correlation peak at angles 2θ=7.9° and 8.9°, characterizing the crystalline MFI structure of the ZSM-5 zeolite. The Si/Al mole ratio obtained by XRF was 59. A SEM image of the spherical elementary particles obtained indicated that these particles have a dimension characterized by a diameter in the range 50 nm to 30 μm, the size distribution of these particles being centred around 15 μm. The Raman spectrum of the final material revealed the presence of polymolybdate species interacting with the support with characteristic bands for these species at 952 and 887 cm⁻¹.

The invention claimed is:
1. A process for the preparation of an inorganic material with a hierarchical porosity in the micropore and mesopore domains, said material being constituted by at least two elementary spherical particles having a maximum diameter of 200 microns, each of said spherical particles comprising metallic particles containing at least one or more metals selected from vanadium, niobium, tantalum, molybdenum, tungsten, iron, copper, zinc, cobalt and nickel, said metallic particles being present within a matrix, which is mesostructured, based on silicon oxide, having microporous walls with a thickness in the range 1 to 60 nm, said process comprising at least the following steps:

a) preparing a solution containing zeolitic nanocrystals with a maximum nanometric dimension equal to 60 nm based on silicon and/or precursor elements of proto-zeolitic entities based on silicon;
b) mixing, in solution, said metallic particles or at least one metallic precursor of said metallic particles, at least one surfactant and at least said solution obtained in accordance with a) such that the ratio of the volumes of inorganic and organic materials, $V_{inorganic}/V_{organic}$, is in the range 0.29 to 0.50;
c) aerosol atomization of said solution obtained in step b) in order to result in the formation of spherical particles;
d) drying said particles;
g) eliminating any remaining precursor elements of proto-zeolitic entities based on silicon and at least said surfactant;
h) regenerating said metallic particles to the form of a polyoxometallate which have decomposed during step g); and
i) drying the regenerated particles;
wherein said metallic particles are in the form of a polyoxometallate with formula $(X_xM_mO_yH_h)^{q-}$ where H is a hydrogen atom, 0 is an oxygen atom, X is an element selected from phosphorus, silicon, boron, nickel and cobalt and M is one or more elements selected from vanadium, niobium, tantalum, molybdenum, tungsten, iron, copper, zinc, cobalt and nickel, x being equal to 0, 1, 2, or 4, m being equal to 5, 6, 7, 8, 9, 10, 11, 12 or 18, y being in the range 17 to 72, h being in the range 0 to 12 and q being in the range 1 to 20 and y, h and q being whole numbers.

2. A preparation process according to claim 1, wherein following said step d), a step e) is carried out consisting of autoclaving the particles obtained from said step d) then carrying out a step f) consisting of drying said particles obtained at the end of said step e).

3. A preparation process according to claim 2, in which said zeolitic nanocrystals comprise at least one zeolite selected from zeolites with structure type MFI, BEA, FAU and LTA and/or said proto-zeolitic entities comprise at least one species for initiating at least one zeolite selected from zeolites with structure type MFI, BEA, FAU and LTA.

4. A preparation process according to claim 1, in which said metallic particles have at least one band with a wave number in the range 750 to 1050 $cm^{-1}$ in Raman spectroscopy.

5. A preparation process according to claim 4, in which said metallic particles are oxide nanoparticles comprising at least one metal selected from molybdenum, tungsten and a mixture of these two metals.

6. A preparation process according to claim 5, in which at least one first monometallic precursor based on a metal selected from vanadium, niobium, tantalum, molybdenum and tungsten and at least one second monometallic precursor based on a metal from group VIII are dissolved to provide a solution prior to carrying out said step b), said solution then being introduced into the mixture in accordance with said step b).

7. A preparation process according to claim 1, in which said metallic particles are heteropolyanions with formula 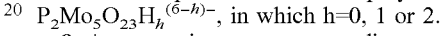, in which h=0, 1 or 2.

8. A preparation process according to claim 1, in which said step a) consists of preparing a solution containing precursor elements of proto-zeolitic entities based on silicon and aluminium.

9. A preparation process according to claim 1, in which said metallic particles are prepared by dissolving, prior to said step b), the metallic precursor(s) necessary for obtaining them in a solvent to provide a solution, said solution then being introduced into the mixture in accordance with said step b).

10. A preparation process according to claim 1, in which at least one sulphur-containing compound is introduced into the mixture said step b) or when carrying out said step g).

11. A process for the transformation of a hydrocarbon feed, comprising 1) bringing an inorganic material obtained in accordance with the preparation process according to claim 1 into contact with a feed comprising at least one sulphur-containing compound, then 2) bringing said material obtained from said step 1) into contact with said hydrocarbon feed.

* * * * *